United States Patent
Hu et al.

(10) Patent No.: US 12,286,351 B2
(45) Date of Patent: Apr. 29, 2025

(54) HIGH TEMPERATURE SINTERING SYSTEMS AND METHODS

(71) Applicant: UNIVERSITY OF MARYLAND, COLLEGE PARK, College Park, MD (US)

(72) Inventors: Liangbing Hu, Rockville, MD (US); Chengwei Wang, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 426 days.

(21) Appl. No.: 17/611,791

(22) PCT Filed: May 18, 2020

(86) PCT No.: PCT/US2020/033505
§ 371 (c)(1),
(2) Date: Nov. 16, 2021

(87) PCT Pub. No.: WO2020/236767
PCT Pub. Date: Nov. 26, 2020

(65) Prior Publication Data
US 2022/0219986 A1   Jul. 14, 2022

Related U.S. Application Data

(60) Provisional application No. 63/022,083, filed on May 8, 2020, provisional application No. 62/975,483, filed
(Continued)

(51) Int. Cl.
C04B 35/44   (2006.01)
C01B 32/05   (2017.01)
(Continued)

(52) U.S. Cl.
CPC .............. C01B 32/05 (2017.08); C04B 35/52 (2013.01); C04B 35/62222 (2013.01);
(Continued)

(58) Field of Classification Search
CPC ................................ C04B 35/52; C04B 35/64
See application file for complete search history.

(56) References Cited

U.S. PATENT DOCUMENTS 5,162,572 A * 11/1992 Markofsky ........... C07C 201/08
560/156
5,169,572 A * 12/1992 Matthews ........... C04B 35/5611
264/102
(Continued)

FOREIGN PATENT DOCUMENTS

CN   101114692 A   1/2008
CN   102859759 A   1/2013
(Continued)

OTHER PUBLICATIONS

CN Office Action, issued Aug. 2, 2022, in Chinese application No. 202080036746.1. (13 pages).
(Continued)

*Primary Examiner* — Robert S Walters, Jr.
*Assistant Examiner* — Kristen A Dagenais
(74) *Attorney, Agent, or Firm* — Rowan Tree Law Group. PLLC; Frederick F. Rosenberger

(57) ABSTRACT

Disclosed are fast high-temperature sintering systems and methods. A method of fabrication includes positioning a material at a distance of 0-1 centimeters from a first conductive carbon element and at a distance of 0-1 centimeters from a second conductive carbon element, heating the first conductive carbon element and the second conductive carbon element by electrical current to a temperature between 500° C. and 3000° C., inclusive, and fabricating a sintered
(Continued)

material by heating the material with the heated first conductive carbon element and the heated second conductive carbon element for a time period between one second and one hour. Other variations of the fast high-temperature sintering systems and methods are also disclosed. The disclosed systems and methods can quickly fabricate unique structures not feasible with conventional sintering processes.

19 Claims, 16 Drawing Sheets

Related U.S. Application Data on Feb. 12, 2020, provisional application No. 62/849,578, filed on May 17, 2019.

(51) Int. Cl.
| | |
|---|---|
| C04B 35/499 | (2006.01) |
| C04B 35/52 | (2006.01) |
| C04B 35/622 | (2006.01) |
| C04B 35/64 | (2006.01) |
| F27D 11/02 | (2006.01) |
| H01M 10/058 | (2010.01) |
| H05B 1/02 | (2006.01) |
| H05B 3/14 | (2006.01) |
| F27D 99/00 | (2010.01) |
| H01M 10/0562 | (2010.01) |

(52) U.S. Cl.
CPC ............. *C04B 35/64* (2013.01); *F27D 11/02* (2013.01); *H01M 10/058* (2013.01); *H05B 1/023* (2013.01); *H05B 3/145* (2013.01); *C01P 2006/40* (2013.01); *C04B 2235/422* (2013.01); *C04B 2235/662* (2013.01); *F27D 2099/0011* (2013.01); *F27M 2003/04* (2013.01); *H01M 10/0562* (2013.01)

(56) References Cited

U.S. PATENT DOCUMENTS

| | | | | |
|---|---|---|---|---|
| 5,182,420 | A * | 1/1993 | Steitz | H01L 21/4846 |
| | | | | 174/250 |
| 6,383,446 | B1 | 5/2002 | Tokita | |
| 9,431,637 | B2 | 8/2016 | Dolle et al. | |
| 10,008,742 | B2 | 6/2018 | Holme et al. | |
| 11,193,191 | B2 | 12/2021 | Yao et al. | |
| 11,369,929 | B2 | 6/2022 | Hu et al. | |
| 11,647,674 | B2 | 5/2023 | Nakada | |
| 2005/0277244 | A1 * | 12/2005 | Galster | B23K 35/004 |
| | | | | 438/202 |
| 2013/0189562 | A1 * | 7/2013 | Dolle | H01M 4/139 |
| | | | | 29/623.5 |
| 2017/0009329 | A1 | 1/2017 | Hunt et al. | |
| 2017/0229424 | A1 * | 8/2017 | Eisele | H01L 24/32 |

FOREIGN PATENT DOCUMENTS

| | | |
|---|---|---|
| CN | 108890114 A | 11/2018 |
| EP | 3055268 A2 | 8/2016 |
| JP | 2000-345208 A | 12/2000 |
| JP | 2013-519990 A | 5/2013 |
| JP | 2013-107779 A | 6/2013 |
| JP | 2019012828 A | 1/2019 |
| KR | 100841418 B1 | 6/2008 |
| KR | 10-2013-0034010 A | 4/2013 |

OTHER PUBLICATIONS

Grasso et al.; "Electric current activated/assisted sintering (ECAS): a review of patents 1906-2008" Science and Technology of Advanced Materials, vol. 10, pp. 1-25 (2009).
International Search Report and Written Opinion of the International Searching Authority issued in corresponding application PCT/US20/33505 mailed Oct. 6, 2020 (14 pages).
AU Office Action, issued Dec. 20, 2022 (Dec. 20, 2022), in Australian application No. 2020279969. (5 pages).
CA Office Action, issued Mar. 24, 2023 (Mar. 24, 2023), in Canadian application No. 3,140,616. (4 pages).
CN Office Action, issued Feb. 19, 2023 (Feb. 19, 2023), in Chinese application No. 202080036746.1. (25 pages).
JP Office Action, issued Feb. 7, 2023 (Feb. 7, 2023), in Japanese application No. 2021-568267. (22 pages).
Wang et al., "A general, highly efficient, high temperature thermal pulse toward high performance solid state electrolyte," *Energy Storage Materials*, 2019 (available online Nov. 12, 2018), 17: pp. 234-241. (9 pages).
AU Office Action, issued Jul. 24, 2023 (Jul. 24, 2023), in Australian application No. 2020279969. (2 pages).
AU Office Action, issued Oct. 13, 2023 (Oct. 13, 2023), in Australian application No. 2020279969. (3 pages).
CA Office Action, issued Oct. 16, 2023 (Oct. 16, 2023), in Canadian application No. 3,140,616. (4 pages).
CN Office Action, issued Jun. 28, 2023 (Jun. 28, 2023), in Chinese application No. 202080036746.1. (12 pages).
CN Office Action, issued Oct. 16, 2023 (Oct. 16, 2023), in Chinese application No. 202080036746.1. (12 pages).
EP Office Action, issued Jun. 16, 2023 (Jun. 16, 2023), in European application No. 20810182.4. (17 pages).
Herrmann et al., "Micro-segregations in liquid phase sintered silicon carbide ceramics," *Journal of the European Ceramic Society*, Apr. 2010, 30(6): pp. 1495-1501. (7 pages).
JP Office Action, issued Aug. 29, 2023 (Aug. 29, 2023), in Japanese application No. 2021-568267. (8 pages).
Zhang et al., "Field assisted sintering of dense A1-substituted cubic phase $Li_7La_3Zr_2O_{12}$ solid electrolytes," *Journal of Power Sources*, Dec. 2014, 268: pp. 960-964. (5 pages).
KR Office Action, mailed Oct. 31, 2024 (Oct. 31, 2024), in Korean Application No. 10-2021-7041179. (22 pages).

* cited by examiner

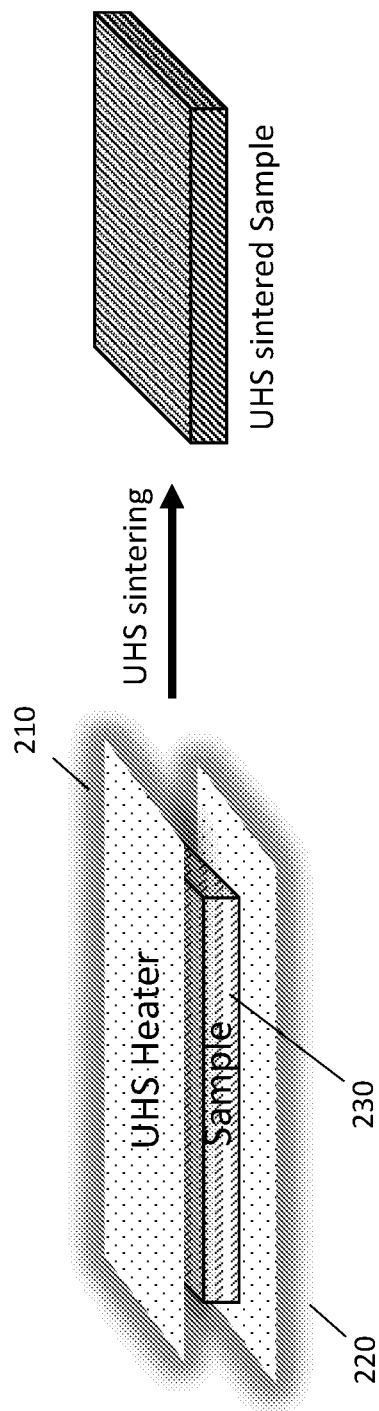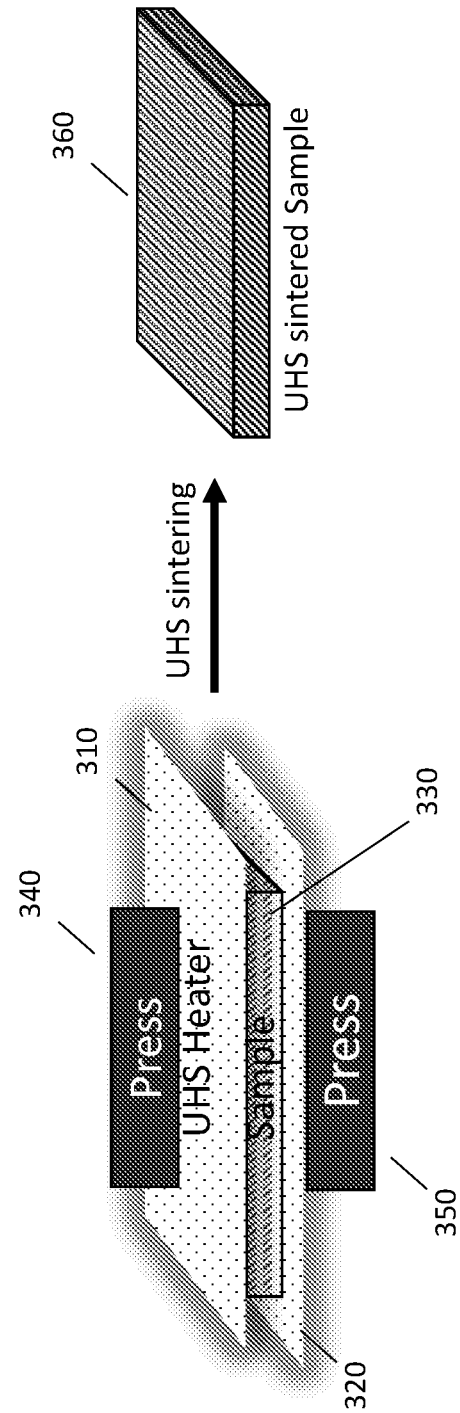
FIG. 2
FIG. 3

HIGH TEMPERATURE SINTERING SYSTEMS AND METHODS

CROSS-REFERENCE TO RELATED APPLICATION

This application is a national phase of International Application No. PCT/US2020/033505, filed May 18, 2020, which claims the benefit of, and priority to, U.S. Provisional Patent Application No. 62/849,578, filed on May 17, 2019, U.S. Provisional Patent Application No. 62/975,483, filed on Feb. 12, 2020, and U.S. Provisional Patent Application No. 63/022,083, filed on May 8, 2020. The entire contents of the foregoing applications are hereby incorporated by reference.

BACKGROUND

Technical Field

The present disclosure relates to sintering systems and methods, and more particularly, to fast high-temperature sintering systems and methods.

Related Art

Ceramics are widely used in electronics, energy storage, and extreme environments due to their high thermal, mechanical, and chemical stability. The sintering of ceramics is a technology that can be traced back to more than 26,000 years ago. Conventional ceramic synthesis often involves two steps: a solid state reaction to form the ceramic from precursors, and sintering to form a solid component. Each step requires high-temperatures and hours of processing time, which can lead to undesirable, non-uniform grain growth and become an obstacle for high throughput discovery of advanced ceramic materials. The long sintering time is also a considerable issue in the development of new ceramic-based solid state electrolytes (SSEs) that are critical for new batteries with improved energy efficiency and safety due to the severe volatility of Li and Na during sintering.

The process temperature of traditional sintering methods is typically limited to about 1200° C. due to the limitation of heating elements. With specially designed graphite furnaces, the temperature can achieve 2000° C. However, bulk furnaces are difficult to control for temperature and temperature distribution, and temperature ramping and cooling rates are prolonging. The bulky and sealed equipment are also difficult to monitor and study to understand possibilities for improvement, which results in trial-and-error process with long iterations that heavily limit materials discovery, especially for ceramics, glass and metal materials.

In this regard, substantial effort has been devoted to the development of innovative sintering technologies, such as microwave-assisted sintering, spark plasma sintering (SPS), and flash sintering. However, microwave-assisted sintering fundamentally depends on the microwave absorption properties of the materials, limiting its universal applicability. The SPS technique requires dies to compress the ceramic while sintering, which limits product geometries and scalability and is not suitable for sintering complex 3D structures due to the applied pressure, and it cannot sinter multiple specimens at the same time. A more recently-developed flash sintering method displays a high heating rate of up to about 10,000° C./min. However, it typically requires expensive Pt electrodes and is difficult to apply to specimens with complex geometry (e.g., 3D structures). In particular, the specific flash sintering conditions depend strongly on the electrical characteristics of the material, limiting its applicability for high-throughput processing when the material's properties are unknown. Thus, there is interest in developing and improving sintering technology that can be more universally applied for higher throughput processing.

SUMMARY

The present disclosure relates to fast high-temperature sintering systems and methods. Aspects of the present disclosure provide innovative non-material-specific, ultrafast, energy-saving sintering technology that can be applied to different materials to enable high-throughput fabrication of bulk ceramics for a broad range of technological applications.

In accordance with aspects of the present disclosure, a method of fabrication includes positioning a material at a distance of 0-1 centimeters from a first conductive carbon element and at a distance of 0-1 centimeters from a second conductive carbon element; heating the first conductive carbon element and the second conductive carbon element by electrical current to a temperature between 500° C. and 3000° C., inclusive; and fabricating a sintered material by heating the material with the heated first conductive carbon element and the heated second conductive carbon element for a time period between one second and one hour.

In various embodiments of the method, the method includes initiating heating of the first conductive carbon element and the second conductive carbon element, and the first conductive carbon element and the second conductive carbon element achieve a temperature between 500° C. and 3000° C., inclusive, within thirty seconds of initiating the heating.

In various embodiments of the method, at least one of the first conductive carbon element and the second conductive carbon element are at least partially in contact with the material, and the method further includes applying pressure to at least partially press at least one of the first conductive carbon element and the second conductive carbon element against the material during the heating of the material.

In various embodiments of the method, the method includes holding the material on a conveyor strip, where the first conductive carbon element is positioned above a portion of the conveyor strip, and where the second conductive carbon element is positioned at one of: a position below a portion of the conveyor strip, or as a portion of the conveyor strip, and where positioning the material includes advancing the conveyor strip to convey the material between the first conductive carbon element and the second conductive carbon element.

In various embodiments of the method, the method includes, at an end of the time period, advancing the conveyor strip to remove the sintered material from between the first conductive carbon element and the second conductive carbon element while maintaining the temperature of the first conductive carbon element and the second conductive carbon element.

In various embodiments of the method, the material is a 3D-printed material having a composition and a structure, and the sintered material is a functional device that maintains the composition and the structure.

In various embodiments of the method, the material is a powder having a plurality of compositions, and fabricating the sintered material includes causing the plurality of compositions to react during the time period.

In various embodiments of the method, the sintered material is one of: metals, alloys, high entropy alloys, refractory metals, refractory alloys, ceramics, or ion conductors.

In various embodiments of the method, the sintered material is one of glass dense structure or a transparent ceramic dense structure, and fabricating the sintered material includes causing the powder to at least partially melt.

In various embodiments of the method, the material is a multilayer structure having at least two layers, wherein the sintered material includes an interface layer between the at least two layers, the interface layer having a depth less than 10 µm.

In various embodiments of the method, the material includes at least two compositions, where the sintered material is a composite structure that includes the at least two compositions, and where the composite structure has an interface layer between the at least two compositions, where the interface layer having a depth less than 10 µm.

In various embodiments of the method, the material is identified in a computational study, and the method includes analyzing the sintered material to validate computations of the computational study.

In various embodiments of the method, the method includes positioning a plurality of additional materials between the first conductive carbon element and the second conductive carbon element, and fabricating a plurality of additional sintered materials by heating the plurality of additional material with the heated first conductive carbon element and the heated second conductive carbon element for the time period, where the plurality of additional materials are co-sintered simultaneously with the material.

In various embodiments of the method, the plurality of additional materials are identified in a computational study.

In accordance with aspects of the present disclosure, a furnace includes a material, a first conductive carbon element positioned at a distance of 0-1 centimeters from the material, a second conductive carbon element positioned at a distance of 0-1 centimeters from the material, an electrical source configured to cause the first conductive carbon element and the second conductive carbon element to heat by electrical current to a temperature between 500° C. and 3000° C., inclusive, and a controller configured to control the electrical source to heat the material with the heated first conductive carbon element and the heated second conductive carbon element for a time period between one second and one hour.

In various embodiments of the furnace, at least one of the first conductive carbon element and the second conductive carbon element are at least partially in contact with the material, and the furnace includes a pressure mechanism, where the controller is configured to control the pressure mechanism to at least partially press at least one of the first conductive carbon element and the second conductive carbon element against the material during the heating of the material.

In various embodiments of the furnace, the furnace includes a conveyor strip holding the material, where a portion of the conveyor strip is positioned between the first conductive carbon element and the second conductive carbon element, and where the controller is configured to control the conveyor strip to convey the material between the first conductive carbon element and the second conductive carbon element.

In accordance with aspects of the present disclosure, a method of fabrication includes positioning a conductive carbon element at a distance of at most 1 centimeter from a material where the material has a larger size than a size of the conductive carbon element, heating the conductive carbon element by electrical current to a temperature between 500° C. and 3000° C., inclusive, and moving the heated conductive carbon element over the material to provide a treated material.

In various embodiments of the method, moving the heated conductive carbon element over the material causes annealing of the material. In various embodiments of the method, the annealing of the material creates a new surface layer at a surface of the material.

In various embodiments of the method, the material includes a thin film over a substrate, the method further comprising depositing the thin film onto the substrate by using one of: sputtering, chemical vapor deposition, atomic layer deposition, or physical vapor deposition.

In various embodiments of the method, moving the heated conductive carbon element over the material causes sintering of the material to provide a sintered material.

In various embodiments of the method, the method includes applying a layer over the sintered material, and moving the heated conductive carbon element over the layer to provide a sintered layer, where the sintered material and the sintered layer together form a sintered multilayer structure.

In various embodiments of the method, the material includes a coated powder over a substrate and the sintered material includes a sintered coating over the substrate.

In various embodiments of the method, the material is one of: a printed film of solid state electrolyte (SSE) precursor or a film of an SSE powder, and the method includes dispensing one of an SSE precursor slurry or the SSE powder into a film, where the sintered material is a sintered SSE film.

In various embodiments of the method, the material is a thermal barrier coating coated over a metal substrate, where the thermal barrier coating including a top porous layer and a bottom dense layer, where the top porous layer has pore sizes between 1-10,000 nm, where the sintered material is a sintered thermal barrier coating on the metal substrate, and where the top porous layer and the bottom dense layer are one of: co-sintered in a single sintering process, or sintered one layer at a time in separate sintering processes.

In various embodiments of the method, the material is an environmental barrier coating coated over a metal substrate, where the sintered material is a sintered environmental barrier coating on the metal substrate.

In accordance with aspects of the present disclosure, a furnace includes a material, a conductive carbon element positioned at a distance of at most 1 centimeter from the material where the material has a larger size than a size of the conductive carbon element, an electrical source configured to cause the conductive carbon element to heat by electrical current to a temperature between 500° C. and 3000° C., inclusive, a mechanical arm configured to move the heated conductive carbon element over the material to provide a treated material, and a controller configured to control the electrical source to heat the conductive carbon element and configured to control the mechanical arm to move the heated conductive carbon element.

In accordance with aspects of the present disclosure, a structure includes a sintered composite structure having at least two compositions and an interface layer between the at least two compositions, where the interface layer has a depth of less than 10 µm.

In various embodiments of the structure, the at least two compositions of the sintered composite structure include one of: metal and carbon nanomaterials, metal and ceramics, or alloy and alloy, where the carbon nanomaterials include one of: nanotubes or graphene.

In various embodiments of the structure, each of the at least two compositions of the sintered composite structure is a material from the group consisting of: ceramics, glass, metals, alloys, carbon, or polymers.

In various embodiments of the structure, each of the at least two compositions of the sintered composite structure is one of: a dense composition or a porous composition.

In accordance with aspects of the present disclosure, a structure includes a sintered multilayer structure having at least two layers, where a first layer of the at least two layers has a different material than a second layer of the at least two layers.

In various embodiments of the structure, each of the at least two layers of the sintered multilayer structure includes a material from the group consisting of: ceramics, glass, metals, alloys, carbon, or polymers.

In various embodiments of the structure, each of the at least two layers of the sintered composite structure is one of: a dense layer or a porous layer.

In various embodiments of the structure, the first layer of the sintered multilayer structure is a porous layer and the second layer of the sintered multilayer structure is a dense layer, wherein the dense layer is one of: a single dense layer or at least two dense sub-layers.

In various embodiments of the structure, the at least two layers of the sintered multilayer structure includes a third layer, wherein the third layer is a porous layer.

In various embodiments of the structure, the first layer is a solid state electrolyte and the second layer is a different solid state electrolyte, and the sintered multilayer structure forms a multifunctional solid state electrolyte.

In various embodiments of the structure, the at least two layers includes a third layer, wherein: the first layer is a solid state electrolyte, the second layer is an electrode, and the third layer is an interface layer between the electrode and the solid state electrolyte, where the interface layer has a depth less than 10 µm.

In various embodiments of the structure, the structure includes a solid state battery, where the solid state battery includes the sintered multilayer structure, and the sintered multilayer structure is a solid state electrolyte.

In various embodiments of the structure, the structure includes a fuel cell, where the fuel cell includes the sintered multilayer structure, and the sintered multilayer structure is a solid state electrolyte.

In aspects of the present disclosure, a method of fabricating a thermoelectric device includes providing a p-type thin film on a substrate, providing a n-type thin film on the substrate, positioning at least one conductive carbon element at a distance of at most 1 centimeter from the p-type thin film and the n-type thin film, heating the at least one conductive carbon element by electrical current to a temperature between 500° C. and 3000° C., inclusive, sintering the p-type thin film and the n-type thin film by heat from the at least one heated conductive carbon element, and providing at least one electrode on at least a portion of at least one of the sintered p-type thin film or the sintered n-type thin film.

In various embodiments of the method, the p-type thin film and the n-type thin film are sintered simultaneously.

In various embodiments of the method, the p-type thin film and the n-type thin film are sintered sequentially.

In aspects of the present disclosure, a piezoelectric device includes a first electrode and a second electrode, and a sintered piezoelectric thin film between the first electrode and the second electrode.

Further details and aspects of exemplary embodiments of the present disclosure are described in more detail below with reference to the appended figures.

BRIEF DESCRIPTION OF THE DRAWINGS

The above and other aspects and features of the present disclosure will become more apparent in view of the following detailed description when taken in conjunction with the accompanying drawings wherein like reference numerals identify similar or identical elements and:

FIG. 2 is a diagram of an exemplary configuration of heating elements for the UHS process, in accordance with aspects of the present disclosure;

FIG. 3 is a diagram of an exemplary UHS system that includes applying pressure to the heating elements, in accordance with aspects of the present disclosure;

DETAILED DESCRIPTION

Figure 1:
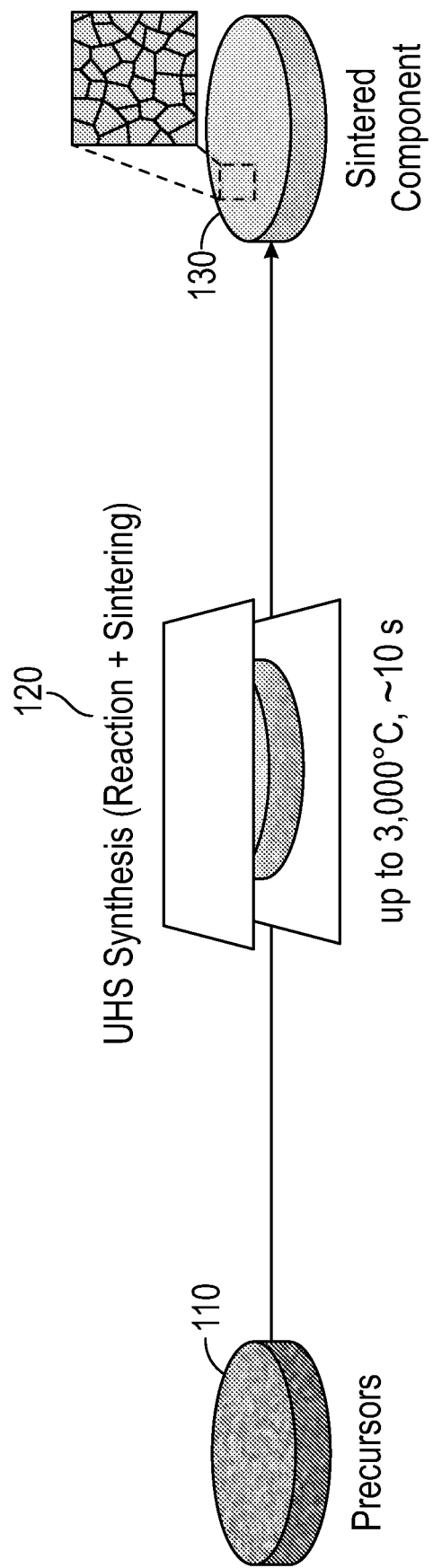
FIG. 1 is a diagram of an exemplary UHS sintering process, in accordance with aspects of the present disclosure.

The present disclosure relates to fast high-temperature sintering systems and methods. Aspects of the present disclosure provide innovative non-material-specific, ultrafast, energy-saving sintering technology that can be applied to different materials to enable high-throughput fabrication of bulk ceramics for a broad range of technological applications. As will be explained below and in connection with the figures, the present disclosure provides systems and methods for sintering many types of materials in a process that can be as fast as forty-five seconds or less, providing a significant improvement over conventional furnace sintering times of more than twenty hours.

As used herein, and unless otherwise indicated otherwise, the term "sintering" refers to a process which forms a solid mass of material by heat and/or pressure without completely liquefying the material and can include processes which partially melt a material without completely liquefying it. In certain situations, the term "sintering" may refer to a process that melts materials, as explained for various situations described below.

The sintering process disclosed herein may be referred to as ultrafast high-temperature sintering ("UHS") or as high temperature pulse ("HTP") sintering. The UHS process features uniform temperature distribution, fast heating rates (e.g., 2,000-100,000° C./min) and fast cooling rates (e.g., up to about 10,000° C./min), and high sintering temperatures (e.g., up to about 3,000° C.). The high heating rates and high temperature of the heating source enable ultrafast sintering times of less than ten seconds and overall processing times of approximately forty-five seconds or less. Additionally, the UHS process is scalable and has minimal sample requirements in terms of intrinsic properties and preparation, thus providing universal and rapid ceramic synthesis and sintering. UHS enables rapid experimental validation for new material predictions from computation to facilitate materials discovery. Accordingly, the systems and methods disclosed herein provide a significant advance for rapid materials screening and synthesis that could be applied in a wide range of fields, including batteries, 3D printed ceramics, and high-entropy ceramics with vast compositional space that is otherwise difficult to explore.

In accordance with aspects of the present disclosure, and as explained in more detail later herein, the UHS process directly synthesizes ceramics from oxide precursors in a single step, in which the precursor pellet is quickly and uniformly sintered between two carbon strips through radiative heating. The short sintering time prevents volatile evaporation and undesirable interdiffusion at interfaces (i.e., cross-contamination). Additionally, the UHS process is compatible with 3D printing of ceramic precursors, producing novel structures that are retained after sintering, in addition to well-defined interfaces between multilayer ceramic compounds, with applicability for thin film SSE applications.

The UHS process for synthesizing ceramics or other solid materials has the following attributes. (1) The UHS process can directly synthesize and sinter precursors into solid, dense ceramics or glass thin films, reducing sintering time from tens of hours to less than ten seconds, which allows fast converging to successful synthesis for rapid materials screening. (2) High temperature leads to melted and merged grain boundaries while avoiding/mitigating uncontrolled grain growth. Such control results in outstanding performance and superior mechanical and electrochemical properties. (3) Short sintering time avoids/mitigates Li loss problem of solid state electrolytes (SSEs) during synthesis and avoids/mitigates side reactions, and results in multilayer structures without crossover diffusion. (4) The UHS process is a universal process for a wide range of ceramics, glass, and other solid materials. These attributes demonstrate the uniqueness of the UHS process as a physicochemical process for discovering ceramics, glass, and other solid materials.

Portions of the present disclosure refer to U.S. Provisional Patent Application No. 62/849,578, filed on May 17, 2019, which has been incorporated by reference in its entirety, and which may be referred to herein as "Supplement."

Portions of the present disclosure refer to U.S. Provisional Patent Application No. 63/022,083, filed on Apr. 30, 2020, which has been incorporated by reference in its entirety, and which may be referred to herein as "Supplement B."

Referring now to FIG. 1, there is shown an exemplary UHS process for sintering material precursors. The precursors 110 are directly sintered into a dense ceramic pellet 130 in approximately ten seconds in one step at a high sintering temperature of up to about 3,000° C. In contrast, a conventional ceramic synthesis is a two-step process that involves a 5-10 hour solid-state reaction step at 800-1,000° C. for forming the ceramic phase from precursors, followed by hours-long sintering at typically 1,000-1,600° C. to form dense components. In general, the UHS sintering process is approximately 2-4 orders of magnitude faster than conventional sintering methods (Supplement, Table 51).

In FIG. 1, an exemplary embodiment of the UHS process is shown, in which the precursor pellet 110 is directly "sandwiched" between two blanket Joule-heating carbon strips 120 that can rapidly heat the sample pellet 110 through radiation and/or conduction to form a uniform high-temperature environment for quick synthesis (solid-state reaction) and reactive sintering. In an inert atmosphere, the carbon heating elements 120 can provide a temperature higher than 3,000° C. (Supplement, FIG. 51), which is sufficient for synthesizing and sintering virtually any ceramic material, though most do not require a temperature this high. In various embodiments of the UHS process, the heating elements 120 can ramp up from room temperature to the sintering temperature in approximately thirty seconds or less, followed by approximately ten seconds of sintering time and then rapid cooling of approximately five seconds. The short processing duration results in the ability to achieve excellent compositional control of ceramics which contain volatile components (e.g., Li in solid-state electrolytes for Li ion batteries), as well as the ability to prevent uncontrolled grain growth for outstanding material performance.

The temperature of the heating elements 120 is tunable to different ramp rates, including heating rates of about 100° C./min to about 20,000° C./min, and cooling rates of about 100° C./min to about 10,000° C./min. The achievable temperature of the heating elements 120 can range from about 500° C. up to about 3,500° C. At maximum sintering temperature, the UHS process enables direct sintering of ceramics, glass, or other solid materials from precursors 110 to dense pellets 130 in less than ten seconds. Due to the rapid sintering speed, evaporation of volatile materials and potential cross-contamination can be significantly minimized, which enables co-sintering of multiple materials in one step.

In contrast, the conventional ceramic synthesis process involves multiple steps and long time. The precursors are first calcinated at about 800-1000° C. for 5-10 hours to form ceramic phase. Then the materials are re-grinded to ceramic power and pressed to pellets, which are sintered at about 1000-1200° C. for another 10-30 hours to form dense pellets. If the ceramics contain volatile components, additional ceramic powder beds with excess volatile components are necessary to compensate the evaporation at high temperature during the long-time sintering. The long sintering time can lead to uncontrollable grain growth and nonuniform size distribution (Supplement, Figure B1A), while the relative low sintering temperature can result in the weak-bonded grain boundaries, which will decrease the mechanical strength and affect the uniformity of the ceramic properties.

When the space between the heating element 120 and the material 110 is small, or the material 110 directly contacts the heating element 120, the temperature ramp rate of the sample 110 can be much faster, and the temperature distribution is more uniform than conventional furnaces. The short sintering time of the UHS process enables control of the grain growth, while the high sinter temperature ensures the excellent welding of the grain boundaries, which leads to uniformly distributed and well-merged small grains for UHS sintered ceramics (Supplement, Figure B1B). Various embodiments of UHS systems and processes are described below in connection with the figures.

FIG. 2 is a diagram of an exemplary configuration of heating elements for the UHS process. One heating element 210 is positioned on one side of the material 230 and a second heating element 220 is position on the other side of the material 230. The heating elements 210, 220 can be wholly or partially in contact with the material 230 or can be positioned 1 cm or less away from the material 230. The material 230 can be supported in various ways, such as by a tray in a furnace used for the UHS process, among others. In various embodiments, the heating elements 210, 220 are positioned such that they are substantially parallel to each other. In various embodiments, the heating elements 210, 220 are positioned such that they are substantially parallel to the material 230 surface closest to the heating element. Positioning the heating elements 210, 220 closer to the material 230 will cause the material 230 to heat at a faster heating rate. Even at a distance of about 1 cm, the heating elements 210. 220 can be capable of heating the materials 230 at a sufficient heating rate to complete the sintering process in a matter of seconds, such as 10 seconds. In various embodiments, the material 230 can be positioned on the bottom heating element 220, and the top heating element 210 can be positioned 1 cm or less away from the material 230. When the top heating element 210 and the bottom heating element 220 are different distances away from the material 220, the heating elements 210, 220 may be heated at different heating rates or may achieve different temperatures based on the different distances. For example, when the material 230 is positioned on the bottom heating element 220, the bottom heating element 220 may be heated to a lower temperature than the top heating element.

In various embodiments, the heating elements 210, 220 can be made of conductive carbon materials, such as carbon papers, carbon felts, carbon clothes, graphite papers, graphite felts, graphite clothes, graphite films, or graphite plates. In various embodiments, other conductive materials or composites can be used for the heating elements. The heating elements 210, 220 can be sized based on sizes of the materials to be sintered and to meet manufacturing needs. When the heating elements 210, 220 are made of conductive materials, the heating elements 210, 220 can be heated by an electrical source (not shown) passing electrical current through the conductive materials of the heating elements 210, 220. The amount of current through the conductive material of the heating elements 210, 220 corresponds to the heating rate, such that the heating rate and electrical source can be controlled by a controller (not shown) by providing a desired amount of current through the conductive materials of the heating elements 210, 220. Heating profiles are described in more detail in Supplement with respect to particular materials. It is sufficient to note here that current should be passed through the heating elements in the same direction to cause the heating elements 210, 220 to apply heat to the material 230 in the same direction. In various embodiments, the heating elements 210, 220 can have approximately a width of 2 cm and a length of 10 cm. Other shapes and sizes for the heating elements are contemplated to be within the scope of the present disclosure.

The heating environment can be a vacuum or can include one or more of inert gas, Ar, $N_2$, hydrogen, carbon dioxide, oxygen, air, and/or other gases. The heating environment can be varied based on the type of material and type of heating elements.

FIG. 3 is a diagram of a UHS system that includes applying pressure to the heating elements. The heating elements 310, 320 and heating environment may be the same as those described in connection with FIG. 2. The heating elements 310, 320 are placed in contact with the material 330, and pressure may be applied to the heating elements 310, 320 by various mechanisms 340, 350, such as hydraulic plates, robotic/mechanical arms, or other mechanical pressure applicators. In various embodiments, the heating elements 310, 320 can be secured to the pressure applicators 340, 350. The application of pressure can cause the sintered materials 360 to have higher density. In various embodiments, the amount of pressure exerted can be electronically controlled by a controller (not shown) based on desired density and/or based on other parameters.

Figure 4:
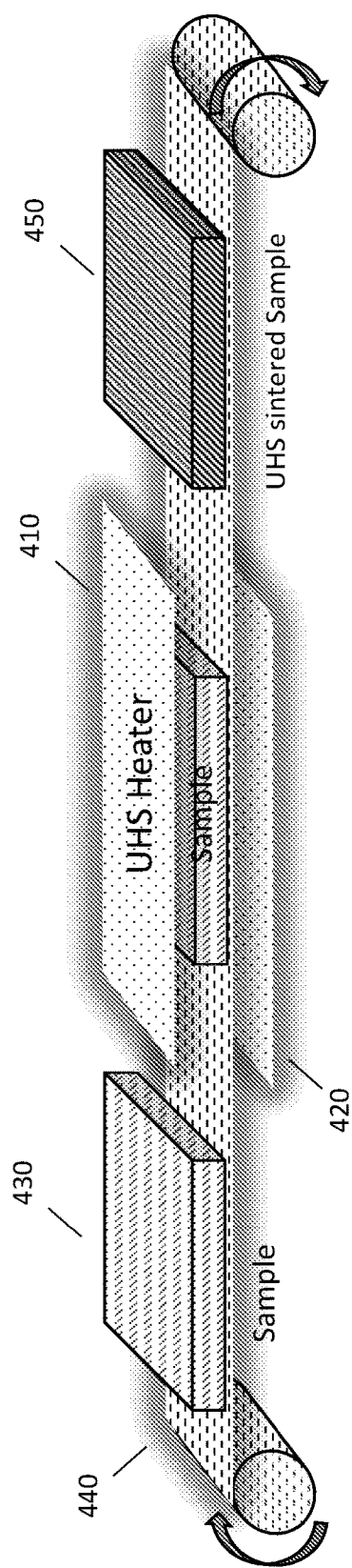
FIG. 4 is a diagram of an exemplary UHS system that includes a conveyor strip, in accordance with aspects of the present disclosure.

FIG. 4 is a diagram of a UHS system that includes a conveyor strip. The heating elements 410, 420 and heating environment may be the same as those described in connection with FIG. 2. The materials 430 can be placed on the conveyor strip 440, and the heating elements 410, 420 may be positioned less than 1 cm away from the materials 430 to be sintered. The conveyor strip 440 can be made of a heat-resistant material that can withstand the high temperatures of the heating elements 410, 420 and that can quickly heat up and cool down. In embodiments where the lower heating element 420 is below the conveyor strip 440, the lower heating element 420 may be heated to a higher temperature than the upper heating element 410 to provide more uniform sintering. In various embodiments, the lower heating element 420 can be incorporated into the conveyor strip 440 and form part of the conveyor strip 440, such that the material 430 to be sintered can be placed in contact with a heating element 420 that is directly on the conveyor strip 440. In embodiments where the material 430 is in contact with the lower heating element 420, the lower heating element 420 may be heated to a lower temperature than the top heating element 410, to provide more uniform sintering. Because the sintering time can be very short (e.g., ten seconds), the conveyor strip 440 can operate continuously for rapid sintering and manufacturing high throughput. In various embodiments, the heating elements 410 may be smaller in size than the size of the material 430, such that the entirety of the material 430 is sintered by the conveyor strip 440 advancing the material 430.

Not every components of a conveyor system is shown or described, as persons skilled in the art will recognize and understand such components. For example, a conveyor system that moves the conveyor strip can include rollers, motors, and controllers, among other components. A controller (not shown) can control an electrical source to heat the heating elements and can control the conveyor system to advance the material. Additionally, the conveyor strip can be used for other purposes, such as post-treatment of solid materials which will be described in connection with FIGS. 10 and 11. For such other purposes, the heating elements may be positioned up to several inches away from the materials and the roll speed of the conveyor strip can be adjustable so that the materials can be heated for a suitable duration, such as from 1 second to 1 hour, or another time duration.

The embodiments of FIGS. 1-4 are exemplary and variations are contemplated to be within the scope of the present disclosure. For example, in various embodiments, only one heating element may be used rather than both heating element being used. In various embodiments, rather than having two heating elements, the systems and processes of FIGS. 1-4 may have only one heating element. The time to heat the heating elements to a target temperature can vary. The amount of time to sinter a material can vary and can be between one second and one hour.

Figure 5:
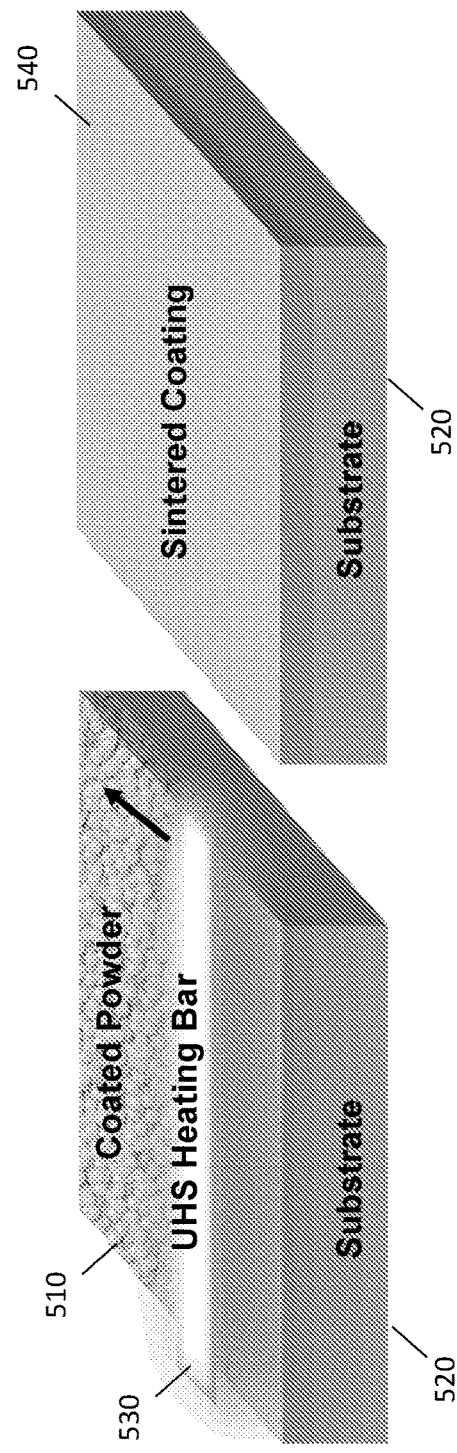
FIG. 5 is a diagram of an exemplary USH system that includes a movable heating bar for sintering a top layer of a material, in accordance with aspects of the present disclosure.

FIG. 5 is a diagram of a USH system that includes a movable heating bar for sintering a top layer of a material. The heating bar 530 can include a heating element made from the materials described in connection with the heating element of FIG. 2. The heating element can be secured to a mechanical arm or other mechanical mechanism (not shown) that can move the heating element across the surface of a material 510. As described above, the heating element can be positioned approximately 1 cm or less away from the surface of the material 510. The heating bar 530 can be scanned across the surface of the material 510 to sinter a top layer 540 of the material, such as a coating layer 510 above a substrate 520, thin films, or other multilayer structures. Not every component of a heating bar system is shown or described, as persons skilled in the art will recognize and understand such components. For example, a heating bar system that moves the heating bar can include motors, sensors, and controllers, among other components. The controller can control an electrical source to heat the heating bar and can control the mechanical arm or other mechanism to move the heating bar across the surface of the material.

In various embodiments, the heating bar 530 UHS system can be applied to a coating 510 process involving steel powder. As an example, in the coating process, a steel powder (e.g., powder mixture of elemental metals, i.e. Fe, Mn, Ni, Cr, 1-5 µm powder size) with 3-5 wt % polymer binder can be dispersed in ethanol to make a slurry. The viscosity of the slurry can be controlled by tuning the concentration of the metal powders and polymer binder for different coating techniques, including spray coating and doctor blade. The powder slurry can then deposited on a steel substrate or the pipe wall with a wet thickness of ~5 mm. After the coating layer dries in air, a carbon heating bar with a temperature of ~1500° C. can be closely run over the coating layer to sinter the coating into a dense steel layer. After the UHS sintering process, the area of the coating layer close to the carbon heating bar was sintered into dense and shiny steel in about five seconds. Cross-sectional SEM image show that the sintered steel is about 1 mm thick, dense, and has a tight binding with the steel substrate (Supplement B).

Accordingly, various systems for performing the UHS process are described above. The following paragraphs will describe applications of the UHS process for various structures and uses.

Figure 6:
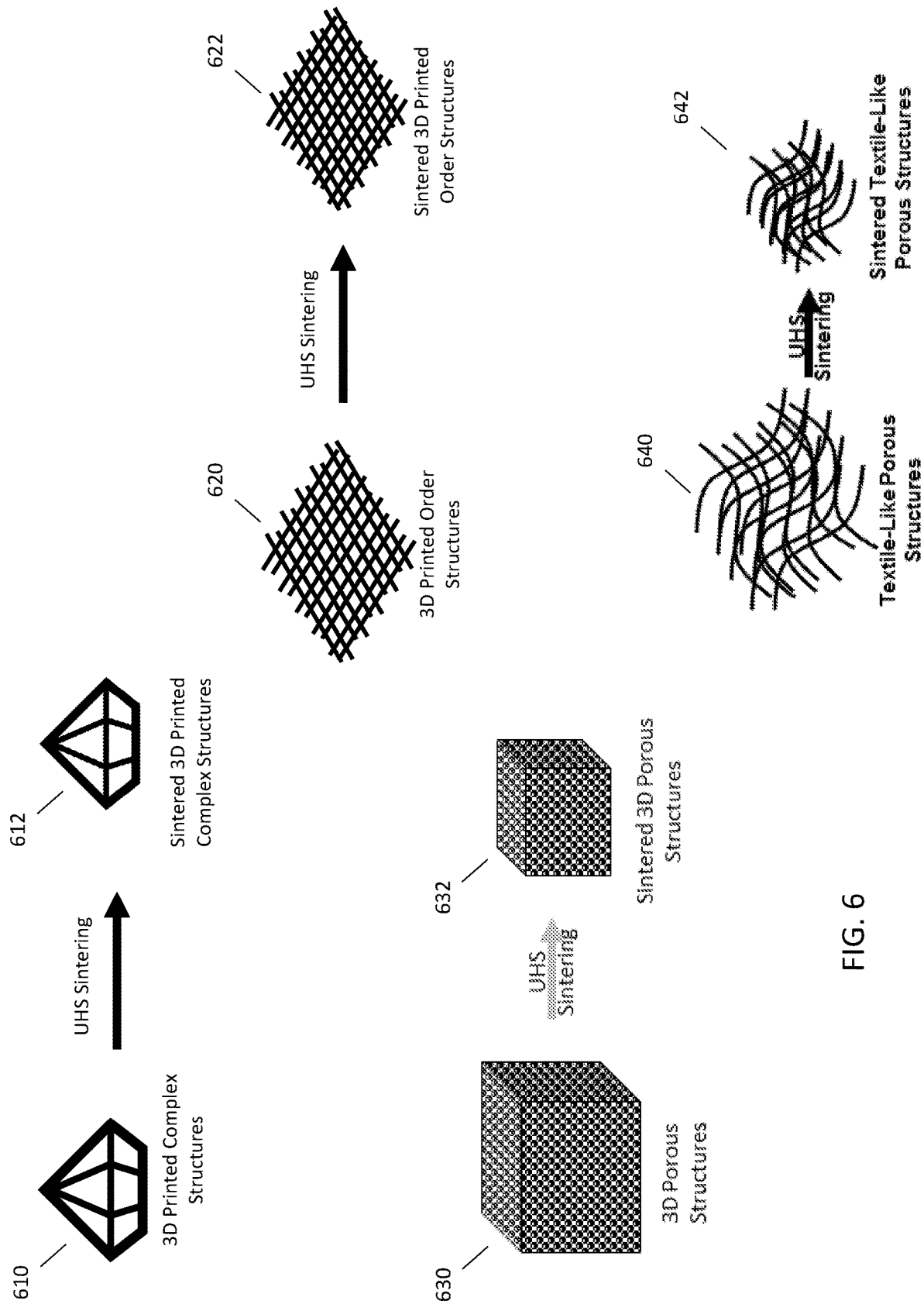
FIG. 6 is a diagram of an exemplary 3D-printed structures which can be sintered using UHS systems and processes, in accordance with aspects of the present disclosure.

FIG. 6 is a diagram of 3D-printed structures which can be sintered using UHS systems and process, including complex 3D-printed structures 610, ordered 3D-printed structures 620, porous 3D-printed structures 630, and texture-like porous 3D-printed structures 640. The composition of the 3D-printed structures 610, 620, 630, 640 can include various solid materials, including ceramics, glass, metals, alloys, carbons, polymers, and other solid state materials and their composites. The geometries of the 3D-printed structures 610, 620, 630, 640 can be any shape. The structures can be formed by 3D printing methods that include extrusion, UV-aided solidification, ink jet, or any other printing techniques. In various embodiments, the 3D-printed structures 610, 620, 630, 640 can be functional devices having different compositions and complex structures.

Uniform temperature distribution of the UHS systems and processes enable the structures to shrink uniformly in every direction, which maintains the form of the printed structures 612, 622, 632, 642 after UHS sintering. Thus, the UHS process maintains the composition and structure of the devices after sintering 612, 622, 632, 642 to achieve functional devices. In various embodiments, the sintered 3D-printed structures 612, 622, 632, 642 can maintain excellent mechanical, electrical, optical, thermal, acoustic, magnetic, and other physical and chemical properties, after undergoing the UHS process. In various embodiments, the 3D-printed structure can be used as support materials for other applications, such as catalysis. In various embodiments, the UHS systems and processes can be used to sinter complex porous 630 or textile-like porous structures 640. The porous structures 630 can be 3D or 2D structures, which can have various morphologies and can be random or ordered structures. The porosity and pore size of the porous structures 630 and vary. In various embodiments, 2D textile-like structures 642 that have gone through the UHS process can possess flexibility. In accordance with aspects of the present disclosure, the UHS systems and processes disclosed herein (e.g., FIGS. 1-5, 10-15, 21) can be used to sinter all such three-dimensional and/or porous structures, whether they are formed by 3D-printing or by other ways. The illustrated three-dimensional structures are exemplary and do not limit the scope of the present disclosure. The disclosed UHS systems and processes are generally applicable to all three-dimensional structures.

In aspects of the present disclosure, the UHS systems and processes disclosed herein (e.g., FIGS. 1-5, 10-15, 21) can be applied to rapidly sinter metals and alloys directly from powders. Due to the ultra-high temperature of UHS, the UHS process can rapidly sinter metals and alloys directly from powders. The powders for alloy sintering can be a mixture of elemental powders or can be pre-alloyed powders with same composition the resulting bulk material. The metal and alloys can be sintered in various types of UHS systems, including the UHS systems shown in FIGS. 1-5. Table 1 below provides non-limiting examples of compositions that can be sintered by UHS process. Other compositions not shown in Table 1 can also be sintered by the UHS process.

TABLE 1

| | |
|---|---|
| Metals | W, Fe, Cu, Mn, Ni, Al, Zn, Ti, Mg, Cr, Co, Ta, V, Nb, Mo, Au, Ag, Pt, Pd, Sn, Zr, and other metals. |
| Alloys and metallic glasses | Fe-based, Cu-based, Ti-based, Ni-based, Al-based, Mg-based, Zr-based, and other alloys and metallic glasses. |
| High entropy alloys | FeCoNiCrMn, TiZrVNbTa, $Co_{1.5}CrFeNi1.5Ti$, $Al_{0.2}Co_{1.5}CrFeNi_{1.5}Ti$, AlCoCrFeNi, $Cu_{0.5}NiAlCoCrFeSi$, CoCrFeNiCu, CoCrFeNiMn, $CoCrFeNiV$, MoNbTaVW, MoNbTaW, $AlB_xMnNiTi$, $AlCo_xCrCu_{0.5}FeNi$, $Al_xCrCuFeMnNi$, CoCuFeMnNi, $Al_xCo_{0.2}CuFeMnNi$, MoTiVFeNiZrCoCr, ZrTiCuNiBe, PdNiCuP, LaAlNiCu, and CuZrAlY, NbMoTaW, VNbMoTaW, $CoCrFeNiCuAl_{0.5}$, VCuFeCoNi, $Al_{0.5}CrFeCoNi$, $Ti_2CrCuFeCoNi$, AlTiVYZr, ZrTiVCuNiBe, $CrFeCoNiAlCu_{0.25}$, $Al_3CoCrCuFeNi$, $Ni_xCo_{0.6}Fe_{0.2}$—$Cr_ySi_zAlTi_{0.2}$, BeCoMgTi, BeCoMgTiZn, CuNiCoZnAlTi, $AlCoCrFeNiNb_x$, BiFeCoNiMn, $CoCrCuFeNiTi_x$, $AlCoCrFeNiTi_x$, TaNbHfZrTi, TaNbMoW, TaNbVMoW, and $CrCoCuFeNiAl_{0.5}$, $NbCrMo_{0.5}Ta_{0.5}TiZr$, $NbCrMo_{0.5}Ta0.5TiZr$, $Ti_{0.8}CoCrCuFeNi$, $NbTiAlVTaLa_x$, CoCrFeNiCu, and CoCrFeNiAl, TixCoCrCuFeNi, (Ti, Zr, Hf)—(Ni, Cu)—Al, (Fe, Co, Ni)—(Zr, Hf, Nb, Ta, Mo, W)—B, $Cu_{0.5}NiAlCoCrFeSi$, SrCaYbMgZn, $Zn_{20}Ca_{20}Sr_{20}Yb_{20}(Li_{0.55}Mg_{0.45})_{20}$, $Fe_{64}Mo_{14}C_{15}B_6Er_1$, $Zr_{41}Ti_{14}Cu_{12.5}Ni_{10}Be_{22.5}$, $Mg_{65}Cu_{25}Y_9Gd_1$, $Pr_{60}Al_{10}Ni_{10}Cu_{20}$, $Ce_{62}Al_{10}Cu_{20}Co_3Ni_5$, $(Ti_{33}Zr_{33}Hf_{33})_{50}(Ni_{50}Cu_{50})_{40}Al_{10}$, $(Ti_{25}Zr_{25}Hf_{25}Nb_{25})_{70}(Ni_{50}Cu_{50})_{20}Al_{10}$, $(Ti_{33}Zr_{33}Hf_{33})_{70}(Ni_{33}Cu_{33}Ag_{33})_{20}Al_{10}$, Ni—Al—Cu—Co—Ti—V—Zn—Zr, TiZrHfTaNb, PdPtNiCuP, and other alloy compositions |
| Ultrahigh-temperature alloys | Ni superalloy, Nb—Si Alloys, Mo—Si—B Alloys, IrRhNbNi, PtAlTa, and other high-temperature alloys. |
| Intermetallics | $Zr_5Si_3$, $Ti_5Si_3$, $MoSi_2$, $TiSi_2$, NiAl, NiTi, $Cu_3Sn$, $MgCu_2$, $Ag_3Sn$, $Cu_3Sn$, FeCo, $MgZn_2$, $MgNi_2$, and other intermetallics. |

Figure 7:
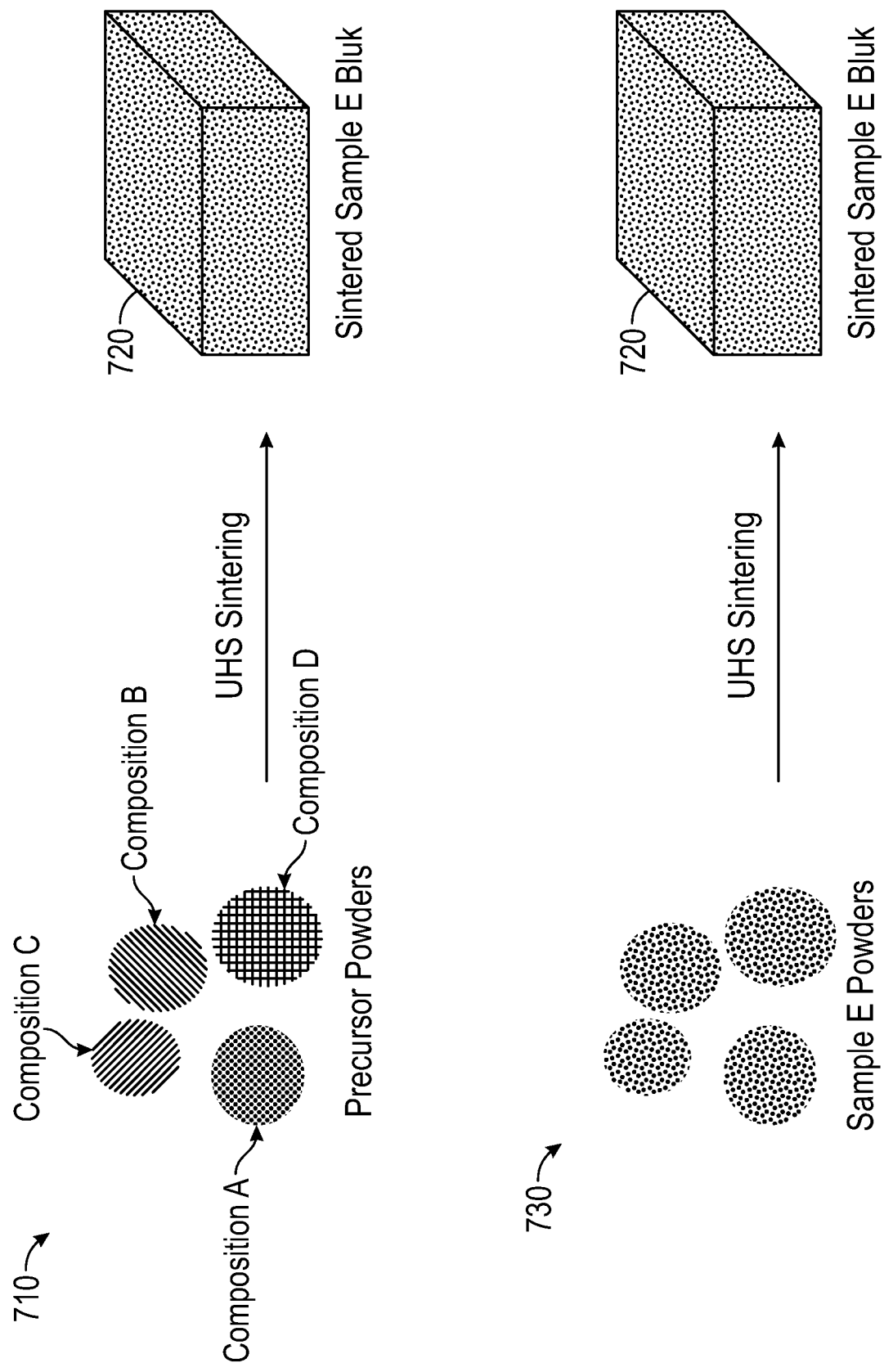
FIG. 7 is a diagram of an exemplary operation of applying the UHS systems and processes to powders, in accordance with aspects of the present disclosure.

FIG. 7 is a diagram of applying the UHS systems and processes to powders. The top portion of FIG. 7 shows an example of reactive sintering in the UHS process, where the precursor powders 710 react and sinter into a dense bulk 720. Compositions A, B, C and D can be elementary powders or oxide precursors 710. When the powders are precursor powders 710, the precursor powders rapidly react and sinter into dense bulk sample 720 in one step during the UHS process. For example, in FIG. 7, the precursor powders A, B, C, and D 710 react during UHS sintering to form resulting bulk material E 720. The bottom portion of FIG. 7 shows an example of direct sintering in the UHS process, where the powders 730 directly sinter into dense bulk 720. In the bottom portion, the powders 730 can be composite powders 730, which form the composite without reaction between them. When the powders 730 are synthesized/composite powders 730 of the resulting bulk material 720, there is no reaction among the powders 730 during the UHS sintering process. With regard to powders, the sintering temperature can be tuned so the powders partially or fully melt to form a dense structure. Thus, in the situation of sintering powders, the term "sintering" permits the powders to fully melt.

In various embodiments, metals and alloys can be sintered in the form of special structures, such as 3D-printed structures as described above in connection with FIG. 6. In various embodiments, the UHS process can be applied to metal coatings in a layer-by-layer printing and sintering process that forms bilayer or multilayer structures, which is described below in connection with FIG. 8. For example, the UHS process can sinter a BMG/crystal bilayer or multilayer structures. In various embodiments, the UHS process can rapidly sinter a wide range of metal and alloys, including Al, Ti, Cu, Fe, refractory metals, refractory alloys, and silicide alloys, which can all be directly sintered from the mixture of the elemental powders. The sintering temperature of these metal and alloys varies from about 1000° C. to about 3000° C. Besides single-composition pellets, the UHS process can be applied to co-sinter multi-materials, such as a Cu/Fe bilayer pellet.

In aspects of the present disclosure, the USH systems and processes disclosed herein (e.g., FIGS. 1-5, 10-15, 21) can be applied to sinter ceramics directly from powders. The ceramics can be sintered in various types of UHS systems, including the UHS systems shown in FIGS. 1-5. Table 2 below provides a non-limiting list of ceramic compositions that can be sintered by UHS process.

TABLE 2

| | |
|---|---|
| Piezoelectric and ferroelectric ceramics | PZT, PMNT (Pb(Mg1/3Nb2/3)O3—PbTiO3), PZNT(Pb(Zn1/31/3Nb2/3)O3—PbTiO3)PbTiO3, KNN(K1/2Na1/2NbO3), BaTiO3(A=Ca, B=Zr, Sr), BZT-xBCT((1-x)Ba(Zr0.2Ti0.8)O3-x(Ba0.7Ca0.3)TiO3), ZnO, and other piezo/ferroelectric ceramics |
| Ionic conductor and their thin films | $La_2Mo_2O_9$, $LaGaO_3$, $Ba_2In_2O_5$, YSZ, $LaAlO_3$, garnet, $Al_2O_3$, Li ion conductors, Na ion conductors, Mg ion conductors, Al ion conductors, Ag ion conductors, H ion conductors, O ion conductors, and other ion conductors. |
| Ultra-High Temperature Ceramics | HfC, TaC, ZrC, NbC, TiC, WC, VC, ThC, HfN, TaN, TiN, ThN, ZrN, TiCN, TiC, TiN, MgO—BeO—$Al_2O_3$, $ZrB_2$, $Al_2O_3$, BN, $VB_2$, $TiB_2$, $HfB_2$, $B_4C$, and other ultrahigh temperature ceramics. |

In various embodiments, the ceramics can also be sintered in the form of special structures, such as 3D-printed structures as described above in connection with FIG. 6. In various embodiments, the UHS process can be applied to sinter ceramics in a layer-by-layer printing and sintering process that forms thin films, bilayer, or multilayer structures, which is described below in connection with FIGS. 8 and 12. For example, multiple thin film ion conductors and piezoelectric ceramics can be sintered by the UHS process.

In aspects of the present disclosure, the UHS systems and processes disclosed herein (e.g., FIGS. 1-5, 10-15, 21) can be applied to sinter glass or transparent ceramics directly from powders. The powders for glass or transparent ceramics can be a mixture of precursor powders or can be pre-synthesized powders having the same composition as the resulting bulk material. The glass or transparent ceramics can be sintered in various types of UHS systems, including the UHS systems shown in FIGS. 1-5. Table 3 below provides a non-limiting list of glass or transparent ceramics compositions that can be sintered by the UHS process.

TABLE 3

| | |
|---|---|
| Glass | silicate glass, soda-lime glass, borosilicate glass, lead glass, aluminosilicate, Al2O3—Si2O3, Al2O3—Si2O3—B2O3, P2O5, GeO2, As2O5, Li2O—Al2O3—SiO2, MgO—Al2O3—SiO2, Na2O—Al2O3—SiO2, ZnO—Al2O3—SiO2, BaO—TiO2—Al2O3—SiO2, BaO—TiO2—SrO—Al2O3—SiO2, MgO—CaO—SiO2—P2O5, Fe2O3—CaO•SiO2—B2O3—P2O5, Na2O—CaO—Al2O3—SiO2, Na2O—CaO—B2O3—SiO2, Na2O—CaO—Al2O3—B2O3—SiO2, Na2O—CaO—SiO2, and other glass materials or their composites. |
| Glass (energy efficiency) | Multi-layer glass: glass-TCO-(a-Si)-TCO-glass; glass-TCO-(a-Si)-Al-glass (Transparent conducting oxide is called as "TCO") BaTiO3 (BT) and PbTiO3 (PT) doped glass BaTiO3—V2O5—B2O3 SiO2—ZnO SiO2—TiO2 VO2—SiO2—TiO2 Glass foam: glass-carbon composite |
| Transparent ceramics | $Y_2O_3$, $Y_3Al_5O_{12}$, $MgAl_2O_4$, $MgF_2$, ZnS, ZnSe, $Al_{23}O_{27}N_5$, $Al_2O_3$ $Tb_3Al_5O_{12}$, $Tm_3Al_5O_{12}$, $Lu_2O_3$, $Sc_2O_3$, $A_2B_2O_7$, $CaF_2$, $SrF_2$, $BaF_2$, CsI, ZnSe, $Sr_5(PO_4)_3F$, $Lu_2O_3$, $Lu_3Al_5O_{12}$, MgO, Y—$ZrO_2$, YAG, YSZ, and other transparent ceramics or their composites. |

In various embodiments, the glass or transparent ceramics can also be sintered in the form of special structures, such as 3D-printed structures as described above in connection with FIG. 6. In various embodiments, the UHS process can be applied to sinter glass or transparent ceramics in a layer-by-layer printing and sintering process that forms thin films, bilayer, or multilayer structures, which is described below in connection with FIGS. 8 and 12.

In aspects of the present disclosure, the UHS systems and processes disclosed herein (e.g., FIGS. 1-5, 10-15, 21) can be applied to sinter borides, carbides, and nitrides directly from powders. The powders for borides, carbides, and nitrides can be a mixture of precursor powders or can be pre-synthesized powders having the same composition as the resulting bulk material. The borides, carbides, and nitrides can be sintered in various types of UHS systems, including the UHS systems shown in FIGS. 1-5. Table 4 below provides a non-limiting list of borides, carbides, and nitrides compositions that can be sintered by the UHS process.

TABLE 4

| | |
|---|---|
| Ultra-High Temperature Ceramics | HfC, TaC, ZrC, NbC, TiC, WC, VC, ThC, HfN, TaN, TiN, ThN, ZrN, TiCN, TiC, TiN, MgO—BeO—$Al_2O_3$, $ZrB_2$, $VB_2$, $TiB_2$, $HfB_2$, $B_4C$, and other composties or high entropy ultrahigh temperature ceramics. |
| Super hard materials | Borides, carbides, nitrides, and other super hard materials. Examples: HfC, TaC, ZrC, NbC, TiC, WC, VC, ThC, HfN, TaN, TiN, ThN, ZrN, TiCN, TiC, TiN, $VB_2$, $TiB_2$, $HfB_2$, WC-Co, β-SiC, ZrC, ZrB, $ZrB_2$, $WB_4$, $MnB_4$, $ReB_2$, $B_4C$, (AlCrNbSiTiV)N, and other composties or high entropy super hard materials. |

In various embodiments, the borides, carbides, and nitrides can also be sintered in the form of special structures, such as 3D-printed structures as described above in connection with FIG. 6. In various embodiments, the UHS process can be applied to sinter borides, carbides, and nitrides in a layer-by-layer printing and sintering process that forms thin films, bilayer, or multilayer structures, which is described below in connection with FIGS. 8 and 12.

Figure 8:
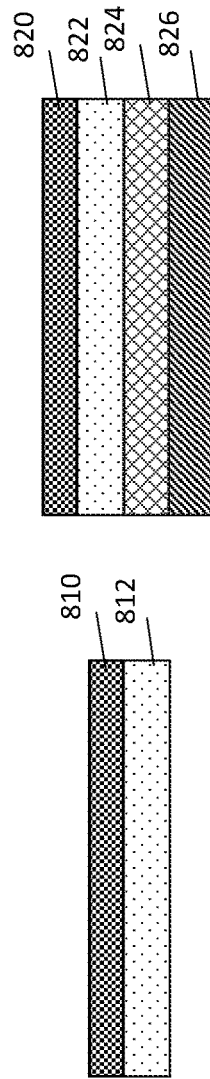
FIG. 8 is a diagram of exemplary multilayer structures formed by applying UHS systems and processes, in accordance with aspects of the present disclosure.

FIG. 8 is a diagram of exemplary bilayer or multilayer structures (bilayer being one instance of multilayer) formed by applying UHS systems and processes disclosed herein (e.g., FIGS. 1-5, 10-15, 21). A bilayer structure can have a first layer 810 and a second layer 820. A multilayer structure as illustrated has layers 820, 822, 824, and 826, and so on. The composition of the layers 810-826 can be any solid materials, including ceramics, glass, metals, alloys, carbons, polymers, and/or other solid state materials. The layers of the bilayer or multilayer structures 810-826 can be dense or porous. The UHS systems and processes described herein (e.g., FIGS. 1-5, 10-15, 21) can be applied to a bilayer structure where one of the layers 810 is a porous structure and the other layer 812 is a dense layer (or vice versa), thereby forming a porous-dense bilayer. The porous layer 810 can be infiltrated with electrode materials for batteries and fuel cell applications. The UHS systems and processes can also be applied to any multilayer structure, such as a porous-dense-porous multilayer structure for solid state battery, flow battery, and/or fuel cell applications. Due to the short sintering time of UHS, the composition of multilayer structures will maintain without cross reaction or diffusion.

In various embodiments, the bilayer or multilayer structures can be ion conductors/solid state electrolytes (SSEs). By developing bilayer ceramics as solid state electrolytes, the advantages of different electrolytes can be combined to form multifunctional SSEs with superior performance in solid state batteries. For example, garnet can act as negative side for stable interface with Li metal, and another layer having good interface with cathode can be on the positive side. Other bilayer or multilayer thin films (e.g., three or more layers) can also be SSEs, and other bilayer and multilayer structure materials are also contemplated to be within the scope of the present disclosure.

In various embodiments, the UHS process can be used to sinter metal and alloy bilayers and multilayers. The composition of each layer 810-826 can be any metals, alloys, and the bulk metal glasses (BMG). The composition of the high temperature sintered metals, alloys, and BMG can be any metals, alloys, metallic glass, intermetallics, and other metals and alloys and their composites. The UHS process enables BMG and crystal compositions to be successfully co-sintered to form bilayer or multilayer structures, which combine both mechanical advantages of BMGs and crystals. Due to the short sintering time, the diffusion between the layers is very small/minimized (such as less than 10 μm) so that each layer can maintains the original structure. As an example, Fe-based BMG/crystal bilayer can be co-sintered using the UHS process. XRD patterns show pure crystal and glass phases of each layer (Supplement B), indicating no obvious side reactions between layers. The bilayer design can also be extended to other metal systems. To further improve the mechanical properties, some crystal phases can be added to the BMG layer to increase the ductility (Supplement B). In this case, the BMG compositions with low glass form ability can be used to in situ create some crystal phase in BMG layer. Due to the fast sintering rate, other crystal phase can also be added to the BMG layer without cross diffusion.

Figure 9:
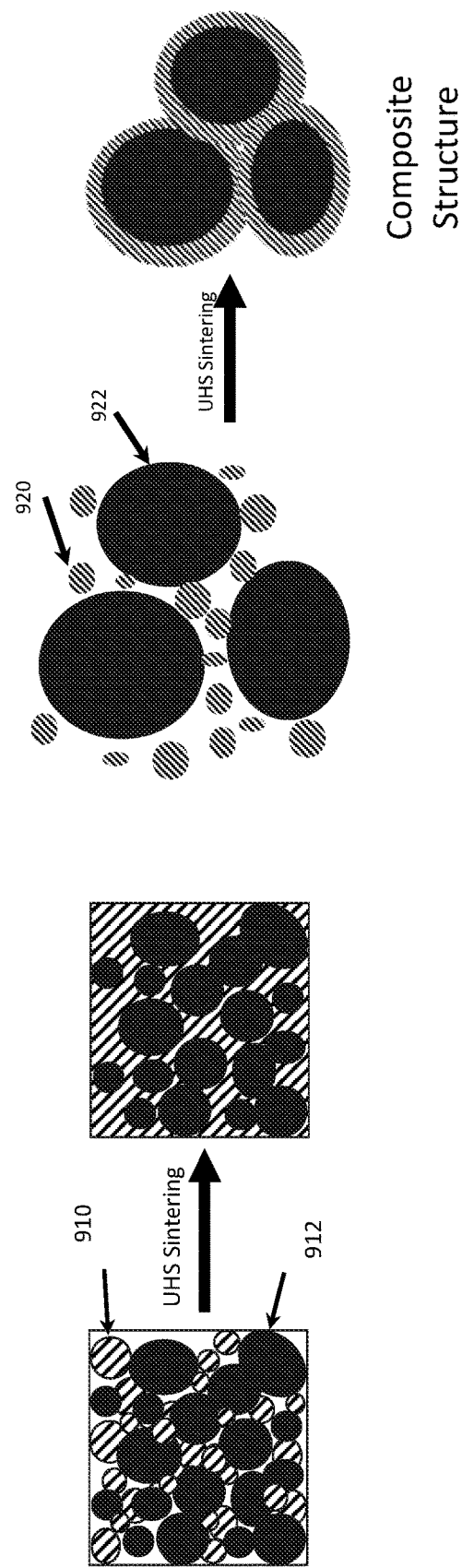
FIG. 9 is a diagram of an exemplary operation of applying UHS systems and processes for co-sintering compositions to form a composite structure, in accordance with aspects of the present disclosure.

FIG. 9 is a diagram of applying UHS systems and processes disclosed herein (e.g., FIGS. 1-5, 10-15, 21) for co-sintering compositions to form a composite structure. In the left side of FIG. 9, the composites have a mixture 912 and other structures 910. In the right side of FIG. 9, the composites have a core-shell 922 and other structures 920. As used herein the term "co-sintering" can refer to applying UHS to sinter multiple compositions to form a composite structure. Due to the short sintering time of UHS, the composition of composite structures will maintain without/ with minimal cross reaction or diffusion (e.g., less than 10 μm). The compositions 910-922 of a composite structure can be a combination of any solid materials, including ceramics, glass, metals, alloys, carbons, polymers, and/or other solid state materials.

As an example, composite SSEs can make use of advantages of different compositions to achieve superior SSEs. By introducing the melting glass state, composite SSEs can be sintered at lower temperature and form denser structure. As an example, a glass-ceramic composite SSE can be sintered by adding $Li_3PO_4$ in LLZTO garnet, where $Li_3PO_4$ can melt at high temperature and weld with LLZTO particles to form a dense composite pellet. EDS mapping indicates no obvious cross-doping (Supplement, Figure B20), and the XRD pattern confirms no secondary phases or side reactions (Supplement, Figure B20A). In contrast, severe side reactions occur between $Li_3PO_4$ and LLZTO during one hour sintering at 1200° C. (Supplement, Figure B21B-D). Therefore, the UHS process enables new structure designs for ceramics and glass materials due to the ultra-fast sintering speed. The UHS process of FIG. 9 can be applied to sintering other composite structures having of two or more compositions. The composition of the composite contents 910-922 can be ceramics, glasses, metals, alloys, carbons, polymers, and other solid state materials. The structure of the composite can be a mixture of multiple phases (as shown in the left side of FIG. 9), or can be a core-shell (as shown in right side of FIG. 9), or can be other structures.

Figure 10:
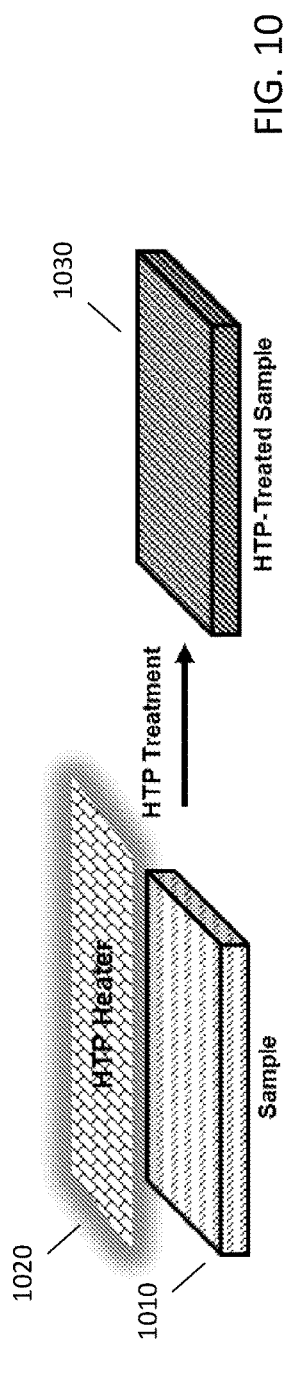
FIG. 10 is a diagram of an exemplary operation of applying UHS systems and processes to conduct post-treatment for solid materials, in accordance with aspects of the present disclosure.

FIG. 10 is a diagram of applying UHS systems and processes to conduct post-treatment for solid materials. The solid materials 1010 can be pre-synthesized or can be formed by other sintering techniques. The UHS systems and processes disclosed herein (e.g., FIG. 1-5) can then be applied to the solid materials 1010 as a post-treatment. For example, the heating element 1010 may be positioned 1 mm to several inches away from the materials 1010. The UHS post-treatment can cause the treated solids 1010 to experience structure, composition, crystallinity, morphology, surface, or other changes. The treated solid materials 1030 can have excellent mechanical, electrical, ionic, optical, thermal, acoustic, magnetic, and/or other physical and/or chemical properties. In various embodiments, the solid materials can be glass or other optical materials with excellent UV-Vis-IR properties or other optical properties. The composition of the solid material 1010 can be any solid materials, including ceramics, glasses, metals, alloys, carbons, polymers, and other solid state materials and their composites.

Figure 11:
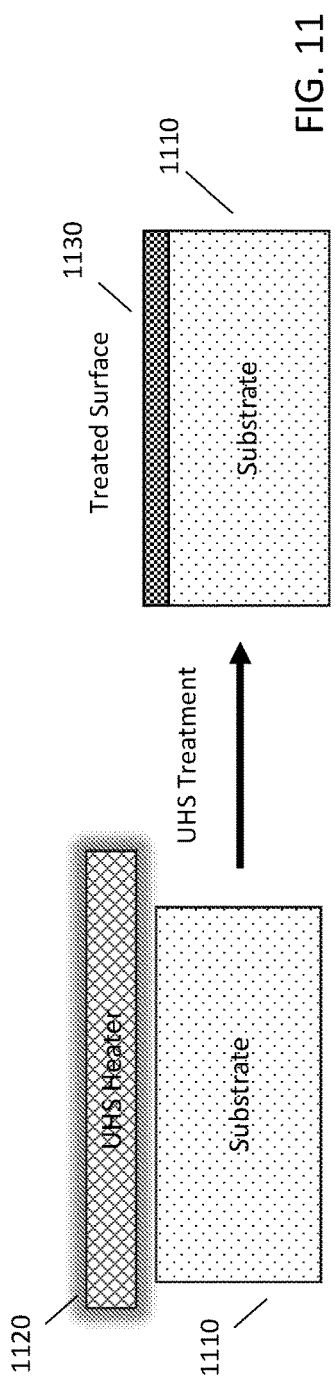
FIG. 11 is a diagram of an exemplary operation of applying UHS systems and processes to treat a surface of a solid material, in accordance with aspects of the present disclosure.

FIG. 11 is a diagram of applying UHS systems and processes disclosed herein (e.g., FIGS. 1-5) to treat a surface of a solid material 1110. The solid material 1110 can be ceramics, glass, metals, alloys, carbons, polymers, and/or other solid state materials. In various embodiments, the solid material 1110 can be in direct contact with the heating element 1120 or can be 1 mm to several inches away from the heating element 1120. In various embodiments, the UHS process and the high temperature can quickly heat the sample surface to form a new surface layer 1130, which has new structure, morphology, composition, or other property changes. The UHS treating temperature and time can be adjusted to achieve desired thickness or properties of the surface layer 1130. Thus, the UHS process can cause a change in just the new surface layer 1130 of the solid material without causing any changes to the bulk properties 1110 beneath the new surface layer 1130. Thus, the UHS surface treatment can cause changes to structure, composition, crystallinity, morphology, and/or other properties of the surface 1130 of the solid material. The treated surface 1130 can have excellent mechanical, electrical, ionic, optical, thermal, acoustic, magnetic, and/or other physical and/or chemical properties.

Figure 12:
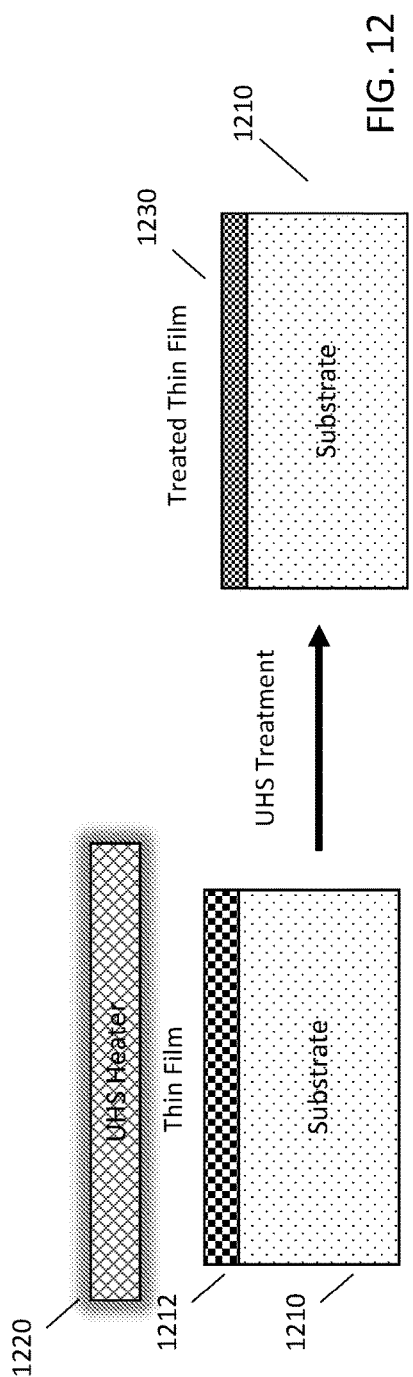
FIG. 12 is a diagram of an exemplary operation of applying UHS systems and processes to treat a thin film at the surface of a substrate, in accordance with aspects of the present disclosure.

FIG. 12 is a diagram of applying UHS systems and processes disclosed herein (e.g., FIGS. 1-5) to treat a thin film at the surface of a substrate. A thin film 1212 can be deposited onto a substrate 1210 by sputtering, chemical vapor deposition (CVD), atomic layer deposition (ALD), physical vapor deposition (PVD), and/or other deposition techniques, and the deposited thin film may have amorphous structure. For example, LiPON, LLZO, and/or LATP ionic conductors can be deposited by ALD or PLD to improve ionic conductivities. Applying UHS to treat a thin film can cause beneficial changes the properties of the treated films 1230. In various embodiments, the thickness of the thin film 1212 can be 1 nm to several millimeters. The composition of the thin film 1212 and the substrate 1210 can be any solid materials, including ceramics, glasses, metals, alloys, carbons, polymers, and/or other solid state materials and their composites. The heating element 1220 may be positioned 1 mm to several inches away from the materials 1212 and treating temperature and time can be adjusted. For example, the heating element may be a conductive heating element as described above herein and can be heated to a temperature between 500° C. and 3000° C., inclusive. The heating element may sinter the materials 1212 in about ten seconds, for example, or in another time duration, such as one second to one hour. The heating element 1220 may have sufficient size to cover the entire material 1212 or may be moved over the material 1212 to sinter the entirety of the material 1212.

Figure 13:
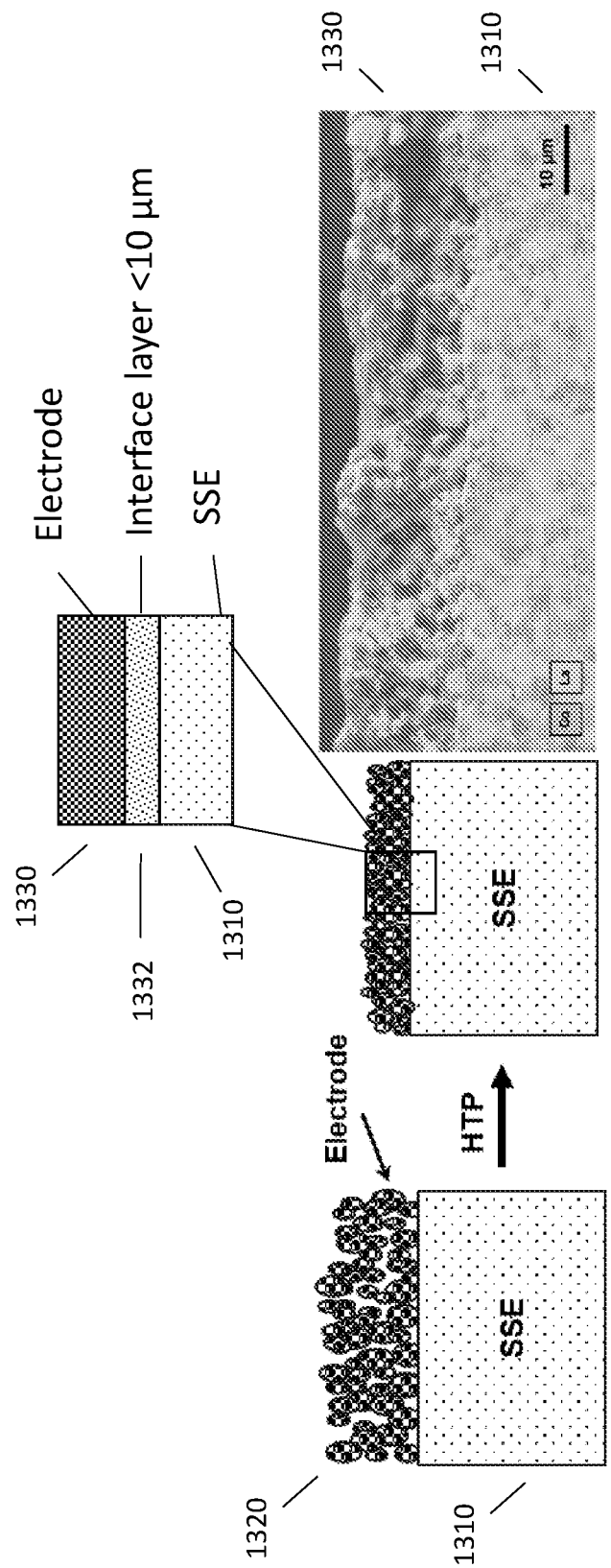
FIG. 13 is a diagram of an exemplary operation of applying UHS systems and processes to co-sinter electrode materials and solid state electrolytes, in accordance with aspects of the present disclosure.

FIG. 13 is a diagram of applying UHS systems and processes disclosed herein (e.g., FIGS. 1-5, 10-12, 15, 23) to co-sinter electrode materials and solid state electrolytes (SSE). In co-sintering of electrodes 1320 and SSEs 1310, a goal is to achieve good interface in solid state batteries for performance, but cross diffusion and side reactions during co-sintering are problems with regular sintering techniques. In the UHS process, due to very low/minimum cross-diffusion, the electrode materials 1320 can be sintered on the SSE 1310 resulting in conformal interface 1332 without side reactions. The UHS process enables in situ synthesis and co-sintering of electrode materials 1330 and SSEs 1310 with good interface 1332 and minimal/no cross doping, as shown in FIG. 13. As an example, an LCO cathode can be directly synthesized and sintered from LiOH and $Co_3O_4$ precursors on a sintered LLZTO garnet using the UHS process. The high temperature provides a quick and thorough reaction to form LCO cathode, while the short sintering time significantly minimizes the potential side reactions between cathode and SSEs. As shown in FIG. 13, EDS mapping indicates there is no obvious cross-doping. This process can apply to other electrode materials 1320 (such as NMC, $LiFePO_4$, $Li_2S$, and other Li, Na, K, Mg, Zn electrode materials, etc.) and other ceramics or glass SSEs 1310 (such as LLTO, LATP, NASICON, LISICON, Thio-LISICON, Na ion conductors, and other solid state ion conductors or their composites).

Figure 14:
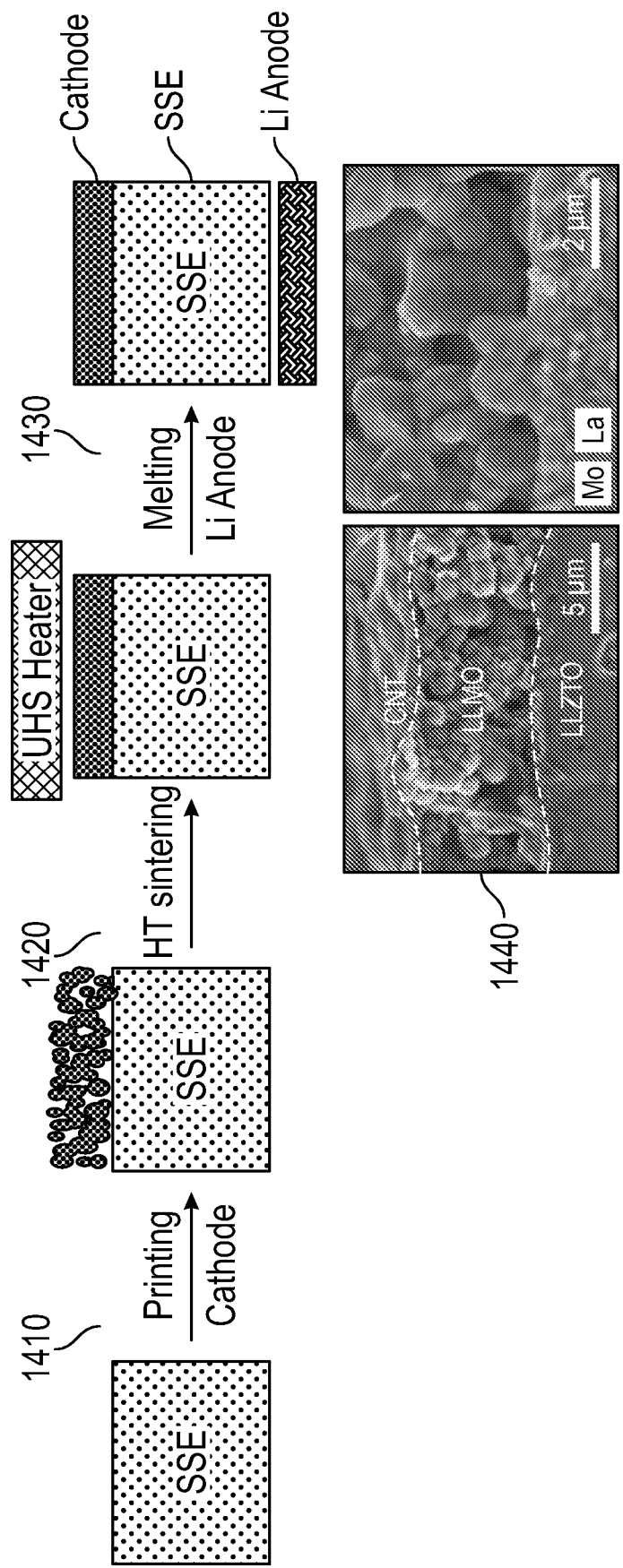
FIG. 14 is a diagram of an exemplary operation of applying UHS systems and processes to co-sinter and fabricate solid state batteries, in accordance with aspects of the present disclosure.

FIG. 14 is a diagram of applying UHS systems and processes disclosed herein (e.g., FIGS. 1-5, 10-12, 15, 23) to co-sinter 1420 and fabricate solid state batteries. As an example of a co-sintered solid state battery, LLMO, an electrical-ionic mixed conductive material serving as an electrode, can be co-sintered with LLZTO garnet. As shown in FIG. 14, the LLMO layer has a good contact with garnet SSE, and EDS mapping 1440 indicates no obvious cross-doping after the UHS sintering. Li can be coated on the other side of garnet SSE 1430 and a layer of CNT can be coated on LLMO as the current collector 1410. The resulting solid state battery can be directly cycled at room temperature without adding any liquid electrolyte. The mixed conductivity of LLMO enables a low resistance for all solid state batteries. The voltage profiles are shown in Supplement, Figure B22, where there are two plateaus at about 1.6 V and 1.2 V. Computation results indicate that these two plateaus may correspond to Li3-Li5 and Li5-Li7 lithiation processes, respectively. The cycling performance shown in Supplement, Figure B22 indicates that the all solid state batteries have excellent cycling stability in more than 600 cycles. Therefore, any all solid state battery can be assembled with UHS systems and processes with excellent interfaces and battery performance. This technique can be extended to fabricate other solid state batteries or fuel cells. The electrode materials can be NMC, $LiFePO_4$, $Li_2S$, and other Li, Na, K, Mg, Zn electrode materials. The electrodes include both cathodes and anodes. The solid state electrolytes can be ceramics, glass, and other solid state ion conductors or their composites, such as LLTO, LATP, NASICON, LISICON, Thio-LISICON, and other Li ion conductors, Na ion conductors, K ion conductors, O ion conductors, H ion conductors, and other ion conductors. The electrode materials can also be sintered into the porous SSE without side reaction.

Figure 15:
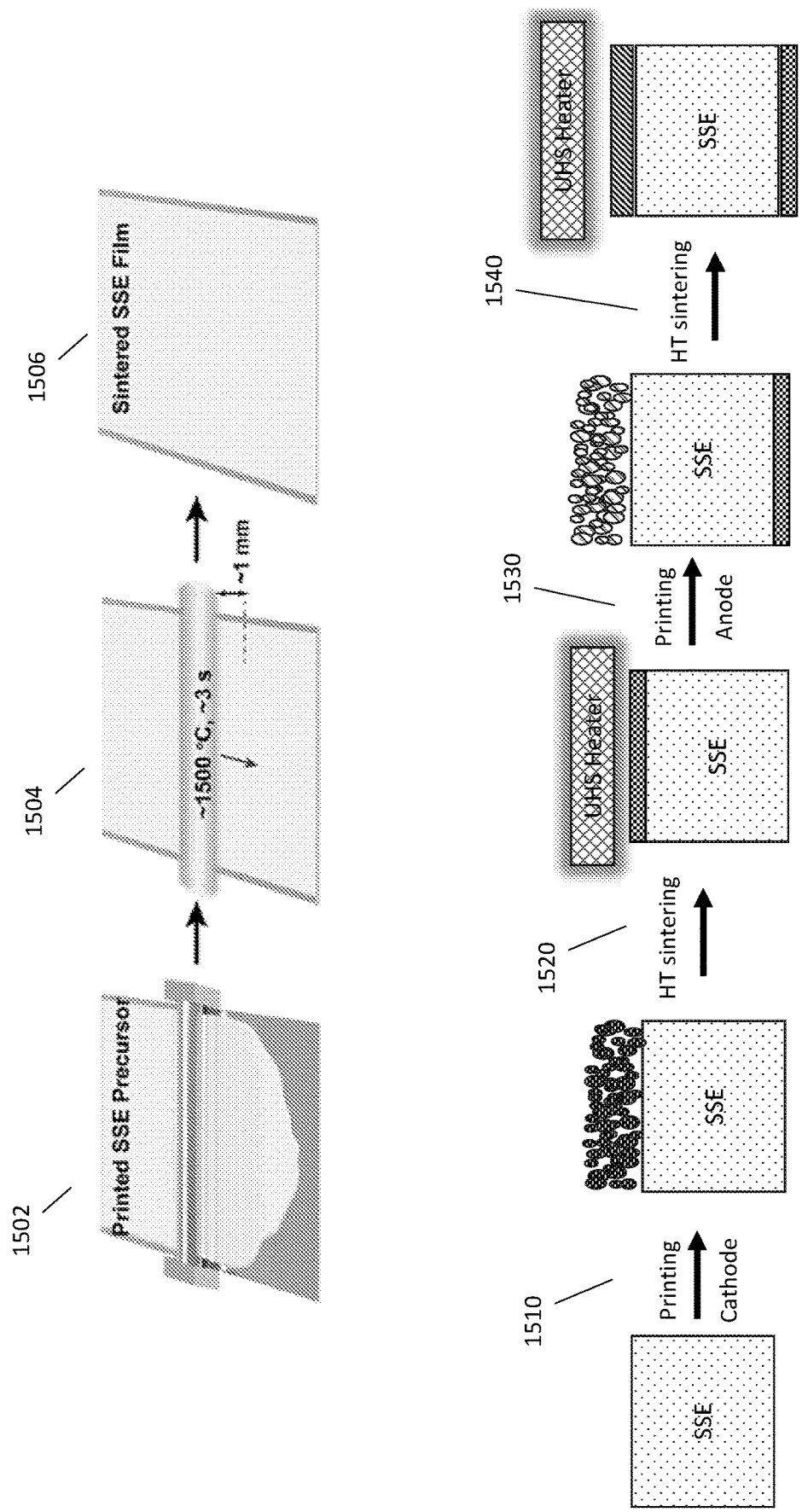
FIG. 15 is a diagram of an exemplary operation of applying UHS systems and processes to fabricate printed thin film batteries, in accordance with aspects of the present disclosure.

FIG. 15 is a diagram of applying UHS systems and processes to fabricate printed thin film batteries. Both the SSE and electrodes can be printed 1510, 1530 with a slurry process followed by a rapid UHS sintering 1520, 1540 to form a dense layer and good interface between the electrodes and SSEs.

The need for safer rechargeable batteries that avoid the use of flammable liquid organic electrolyte has motivated the development of solid-state electrolytes (SSEs), such as lithium phosphorus oxynitride (LiPON) and garnet-based ceramic compounds. SSE thin films (less than 10 μm) that feature a high ionic conductivity of >10$^{-4}$ S/cm are desirable to achieve high energy and power densities. Various methods have been developed to synthesize thin-film ceramic SSEs (e.g., garnet), but they present challenges in sintering thin film electrolyte and cause severe Li and Na loss and corresponding low ionic conductivities. Other methods provide solid-state thin-film batteries with a low current density of 50-800 μA/cm$^2$, but large-scale applications (e.g., electric vehicles) require a current density of up to 3-10 mA/cm$^2$.

The present disclosure provides systems and processes to synthesize thin-film ceramic SSEs using the UHS process and will be referred to herein as "printing and radiative heating", or PRH. PRH provides a solution-based and printable technique for synthesizing ceramic thin film SSEs with improved scalability. PRH operates using sintering temperatures up to 1500° C. for a short period of time (e.g., three seconds). The rapid heating enables the formation of a dense, polycrystalline thin-film structure, but with negligible volatile element loss due to the short sintering time. In the PRH process, a precursor film is printed on a substrate 1502 with a thickness that is tuned by controlling the ink concentration and wet thickness. The air-dried precursor film is then placed in close contact to a radiative heating strip (e.g., about 1500° C.) for rapid close-proximity sintering 1504 by using the UHS process, as shown at the top of FIG. 15. This Joule-heated strip runs across the precursor film with a total heating duration of a few seconds to complete the sintering process 1506. In various embodiments, a conveyor strip system (e.g., FIG. 4) may be used instead of a heating strip or heating bar. The PRH process can be used to fabricate a Li$_{6.5}$La$_3$Zr$_{1.5}$Ta$_{0.5}$O$_{12}$ (LLZTO) ceramic thin film SSE on a single crystal MgO substrate, which features a translucent, dense, and uniform structure. The resulting ceramic thin film exhibits excellent crystallinity, negligible Li loss, and a high ionic conductivity comparable to that of bulk materials. The PRH process 1502-1506 is not material-specific and is able to sinter a range of high-performance solid-state thin films. PRH-sintered thin films 1506 provide significant advantages in term of ionic conductivity, universality, stoichiometry, fabrication speed, crystallinity, and scalability, all of which greatly benefit the development of solid-state batteries.

The PRH sintering process is based on radiative heating, which is not material specific and can be applied to sinter a wide range of compositions. For example, the universality of the PRH process can be used to fabricate Li$_{0.3}$La$_{0.567}$TiO$_3$ (LLTO), Li$_{1.3}$Al$_{0.3}$Ti$_{1.7}$(PO$_4$)$_3$ (LATP), β-Al$_2$O$_3$, and PbZr$_{0.52}$Ti$_{0.48}$O$_3$ (PZT) thin films from precursor ink solutions (Supplement B), all of which contain volatile components. LLTO, LATP, and β-Al$_2$O$_3$ are high performance Li-ion and Na-ion conductors whose thin films face the challenge of controlling Li/Na loss during synthesis. The PRH process can print the LLTO, LATP, and β-Al$_2$O$_3$ precursor inks on an Al$_2$O$_3$ substrate by spray coating, followed by high-temperature (1500° C.) sintering for about 3-5 seconds which provides uniform and dense thin films with thicknesses of 5-10 μm (Supplement B). The LATP and LLTO thin films can be sintered in air to prevent the potential reduction of Ti$^{4+}$. Similar to the LLZTO thin film, no obvious cross-doping or side reactions between the SSE layer and substrate was observed, according to EDS mapping (Supplement B). The grain boundaries of the sintered thin films were well merged due to the melting effect at high sintering temperature. Furthermore, due to the rapid sintering process within three seconds, the Li/Na loss in the LATP, LLTO, and β-Al$_2$O$_3$ SSEs was minimized, which is confirmed from the pure phases in the XRD patterns (Supplement, Figure S12-S14).

The capability of the PRH process to avoid/mitigate elemental loss can be applied to materials containing other volatile elements, such as Pb. The evaporation of Pb at high temperature is one of the main challenges to fabricating PZT, a high-performance piezoelectric ceramic. Conventional fabrication processes involve the low-temperature (~500-800° C.) treatment of sol-gel deposited PZT thin films to avoid/mitigate Pb loss and cracking during sintering. However, low-temperature-treated PZT thin films generally have poor crystallinity, which can affect the piezoelectric behavior of the thin films. In contrast, the PRH process provides a much higher sintering temperature (~1500° C.) to achieve a dense PZT thin film with excellent crystallinity, while the short sintering time greatly minimizes the Pb loss. As an example, PZT precursor ink can be directly printed on an Al$_2$O$_3$ substrate, followed by rapid sintering at 1500° C. for about three seconds. An insufficient sintering time or low sintering temperature results in porous or amorphous PZT thin films, while prolonged sintering or a high sintering temperature lead to severe Pb loss and corresponding phase changes (Supplement B). However, optimized PRH-sintering conditions result in a PZT thin film that demonstrates a dense structure with well-merged grains, while the EDS mapping illustrates the uniformly distributed Pb element (Supplement B). The XRD pattern shows a pure PZT phase without secondary phases caused by Pb loss (Supplement B), which further demonstrates the unique capability of the PRH process for the synthesis of ceramic thin films with volatile compositions. Accordingly, the PRH process has the ability to mitigate/prevent volatile element loss for superior compositional control (Supplement B).

Besides single-component thin films, the PRH process can be used to rapidly sinter composite thin films, as the short sintering time can effectively prevent side-reactions between materials. As an example, the PRH process can be used to sinter a LiBO$_2$-LLZTO composite SSE thin film. The resulting material features LiBO$_2$ uniformly distributed between the LLZTO grains with conformal interfaces and no obvious co-doping, likely due to the short sintering time of three seconds, even with a high sintering temperature of 1200° C. In contrast, sintering the same materials in a conventional furnace for one hour results in a porous structure with large reacted grains rather than a dense composite (Supplement B). Thus, prolonged sintering in a conventional furnace leads to significant cross-diffusion and side reactions between components, while the PRH process is able to avoid/mitigate such side-reactions to generate composite structures (Supplement B). The capability to fabricate a broad range of both single and multi-component compounds indicates the universality of the PRH process for manufacturing high-performance ceramic thin films.

The thin films sintered by the PRH process can have structure, composition, crystallinity, morphology, or other changes and have excellent mechanical, electrical, ionic, optical, thermal, acoustic, magnetic, and other physical and chemical properties. The thickness of the thin film can be 1 nm to millimeters. The composition of the thin film and the substrate can be any solid materials, including ceramics, glasses, metals, alloys, carbons, polymers, and other solid state materials and their composites.

With continuing reference to the bottom portion of FIG. 15, the PRH process can be applied to fabricate solid-state batteries with layered structures via layer-by-layer printing and sintering 1510-1540. As an example, a LiCoO$_2$ precursor solution can be was printed on a thin LLZTO pellet 1510 using a solution process (Supplement B), followed by PRH sintering 1520 at about 800° C. (due to the low reaction temperature) for about three seconds to in situ synthesize the $LiCoO_2$ cathode. Then, a Li metal anode can be coated on the other side of the pellet 1530 and the sintered 1540 to form a $LiCoO_2$/LLZTO/Li solid-state battery for cycling (Supplement B). Cross-sectional SEM imaging and EDS mapping (Supplement B) indicate that the $LiCoO_2$ cathode was uniformly sintered on the LLZTO surface with a conformal and clear interface. The PRH-synthesized $LiCoO_2$ also shows XRD peaks well-matching the standard $LiCoO_2$ phase without much secondary phase, indicating successful synthesis during the three seconds sintering time (Supplement, Figure S20). Due to the high temperature and short sintering time, the sintered $LiCoO_2$ exhibits a nanoporous structure with a grain size of ~200 nm (Supplement, Figure S21) and a well-defined, conformal interface without obvious cross-doping with the LLZTO garnet (Supplement B). To facilitate Li transport in the porous $LiCoO_2$ layer and avoid/mitigate capacity decay due to the volume change of the cathode during cycling, $LiBO_2$ can be used a solid-state binder mixed with the $LiCoO_2$ cathode. Since $LiBO_2$ can melt at about 850° C., the $LiBO_2$ precursor can be directly printed and sintered for about three seconds into the porous $LiCoO_2$ layer using the PRH process, which results in a uniform composite structure (Supplement B).

Due to the conformal interfaces, the interfacial resistance of this PRH-sintered battery was as low as about 100 $\Omega \cdot cm^2$ at 60° C. (Supplement B), which is considerably smaller than other co-sintered all solid-state batteries. The voltage profiles of the printed battery exhibited typical plateaus of the $LiCoO_2$ cathode (Supplement B), further demonstrating the successful synthesis of $LiCoO_2$ via the rapid PRH process. Additionally, the battery's rate and cycling performance show good capacity retention and excellent cycling stability over about 450 cycles (Supplement B). Specifically, the initial specific capacity was about 87 mA·h/g at a current density of 30 mA/g. The capacity slightly decreases with increasing current density but has little change over the cycles at each current density (Supplement B). After about 450 cycles, the interfacial resistance slightly increased to about 170 $\Omega \cdot cm^2$ (Supplement B), which further demonstrates the excellent stability of the in situ sintered cathode and interface synthesized by the PRH process.

This PRH process 1510-1540 can be applied to other electrode materials (such as NMC, $LiFePO_4$, $Li_2S$, and other Li, Na, K, Mg, Zn electrode materials, etc.) and other ceramics or glass SSEs (such as LLTO, LATP, NASICON, LISICON, Thio-LISICON, Na ion conductors, and other solid state ion conductors or their composites).

Figure 16:
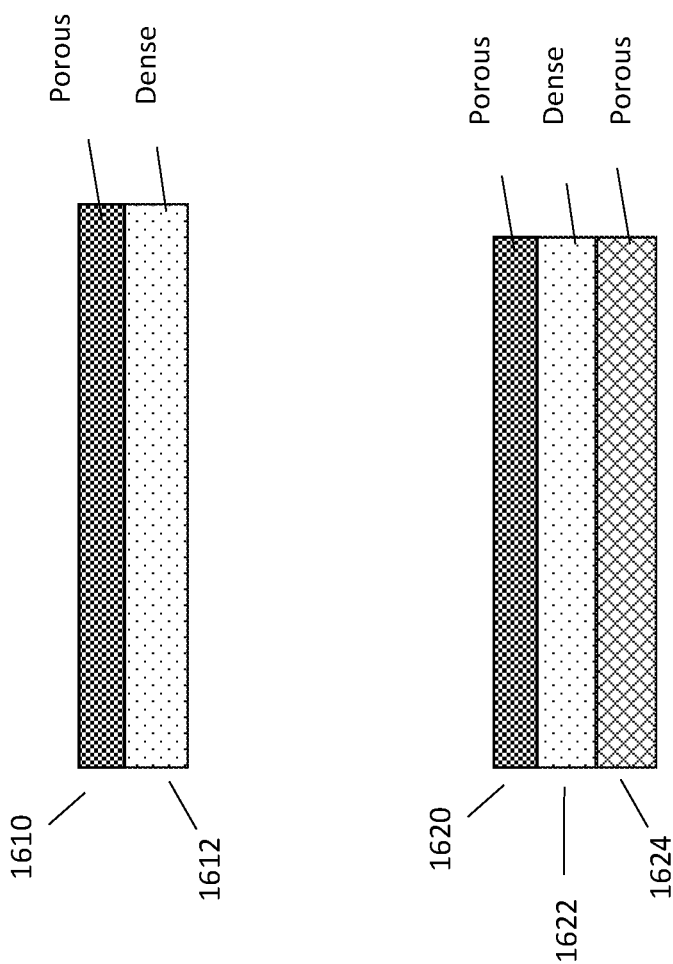
FIG. 16 is a diagram of exemplary multilayer structures formed by applying UHS systems and processes for different applications (e.g., batteries and fuel cells), in accordance with aspects of the present disclosure.

FIG. 16 is a diagram of multilayer structures formed by applying UHS systems and processes disclosed herein (e.g., FIGS. 1-5, 10-15, 21). The bilayer, trilayer, and multilayer structures can be used for fuel cells and batteries (bilayer and trilayer being specific instances of multilayer). In various embodiments, the bilayer and multilayer structures can be formed by 3D-printing or by deposition methods. The thickness of each layer 1610-1624 is about 1-500 µm. A porous layer has the electrode materials for batteries and fuel cells or the composite of electrode materials and SSEs. A dense layer has the solid state electrolytes for battery and fuel cells, which can include, without limitation, Li ion conductors, Na ion conductors, K ion conductors, proton conductors, O ion conductors, Mg ion conductors, and/or Al ion conductors. For a bilayer structure, one layer 1610 can be a porous layer, which can be infiltrated with electrode materials for batteries and fuel cell applications, and the other layer 1612 can be the dense SSE. For a trilayer structure, layers 1620, 1624 can be porous layers for electrode materials loading, and layer 1622 can be the dense SSE to separate anode and cathode materials. Each dense layer may be a single dense layer or can include two or more dense sub-layers of different compositions.

In accordance with aspects of the present disclosure, the UHS systems and processes disclosed herein (e.g., FIGS. 1-5, 10-15, 21) can be used to form solid state batteries containing multilayer structures. UHS can be applied to co-sinter electrodes with bilayer or multilayer SSEs to form a solid state batteries (with bilayer being a specific instance of multilayer). By developing multilayer ceramics as solid state electrolytes, the advantages of different electrolytes can be combined to form multifunctional SSEs with superior performances in solid state batteries. For example, garnet can act as negative side for stable interface with Li metal, and another layer having good interface with cathode can be on the positive side. Due to the short sintering time, the composition of the multilayer or composite structure will maintain without or with minimal cross reaction or diffusion. In various embodiments, any dense layer of a multilayer SSEs 1614, 1624 may be a single dense layer or can have two or more dense sub-layers.

In accordance with aspects of the present disclosure, the UHS systems and processes disclosed herein (e.g., FIGS. 1-5, 10-15, 21) can be applied to form flow batteries or fuel cells containing single layer or multilayer structures. UHS can be applied to co-sinter electrodes with single-layer, bilayer, or multilayer SSEs to form flow batteries (with bilayer being a specific instance of multilayer). The anode and cathode are porous structures which allow the flow of electrode materials in solutions. Due to the short sintering time, the composition of each layer of multilayer SSEs will maintain without or with minimal cross reaction or diffusion.

UHS can also be applied to co-sinter electrodes with single layer, bilayer, or multilayer SSEs to form fuel cells (with bilayer being a specific instance of multilayer). The anode and cathode are porous structures which allow the oxygen and fuel gas (hydrogen or carbon monoxide, or methane) to diffuse. Due to the short sintering time, the composition of multilayer or composite structures will maintain without or with minimal cross reaction or diffusion.

Figure 17:
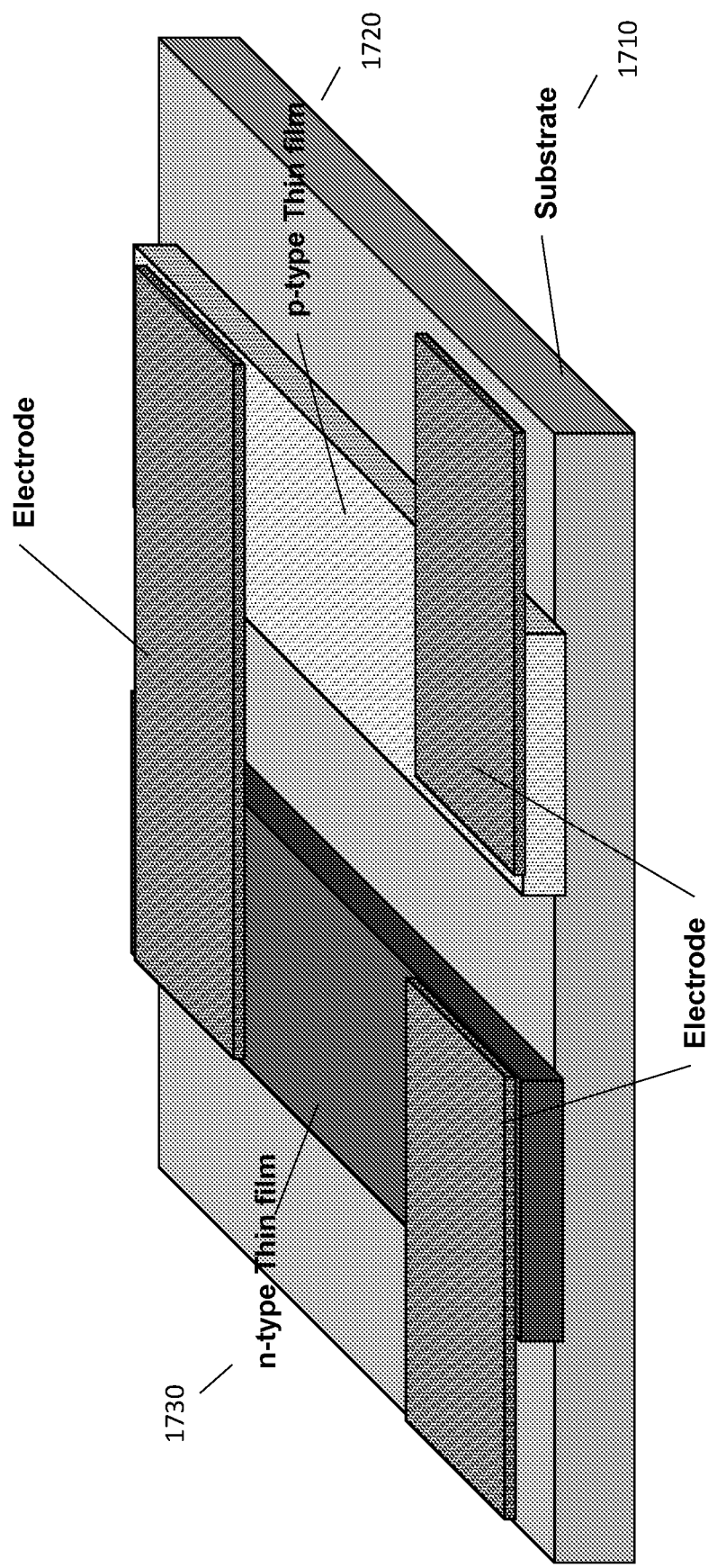
FIG. 17 is a diagram of an exemplary thermoelectric device formed by applying UHS systems and processes, in accordance with aspects of the present disclosure.

FIG. 17 is a diagram of an exemplary thermoelectric device formed by applying UHS systems and processes disclosed herein (e.g., FIGS. 1-5, 10-15, 21). A p-type thin film 1720 or a n-type thin film 1730 can be, for example, printed onto a substrate 1710 and can be sintered to form thin films on the substrate. The printed thin films 1720, 1730 can be sintered using, for example, the system and processes of FIG. 5, among others disclosed herein. In various embodiments, the n-type thin film and the p-type thin film can be sintered simultaneously or can be sintered sequentially. The sintered p-type thin film and n-type thin film on substrate can be used to form thermoelectric devices, such as the example shown in FIG. 17. The electrodes can be sintered onto the thin films using the systems and processes disclosed herein.

A process of forming the thermoelectric device can include providing the p-type thin film 1720 on the substrate 1710, providing the n-type thin film 1730 on the substrate 1710, positioning at least one conductive carbon element at a distance of at most 1 centimeter from the p-type thin film 1730 and the n-type thin film 1720, heating the at least one conductive carbon element by electrical current to a temperature between 500° C. and 3000° C., inclusive, and sintering the p-type thin film and the n-type thin film by heat from the at least one heated conductive carbon element. In various embodiments, the at least one heated conductive carbon element can be moved/scanned over the thin films. In various embodiments, the at least one conductive carbon element can cover both of the thin films. The thin films can be sintered simultaneously or sintered sequentially. At least one electrode can be deposited or sintered on at least a portion of the sintered p-type thin film and/or the sintered n-type thin film. The illustrated and described embodiments are exemplary and variations contemplated to be within the scope of the present disclosure. For example, the thermoelectric device may have a different layout than as illustrated. The heating element may be made from another type of conductive material or composition.

Figure 18:
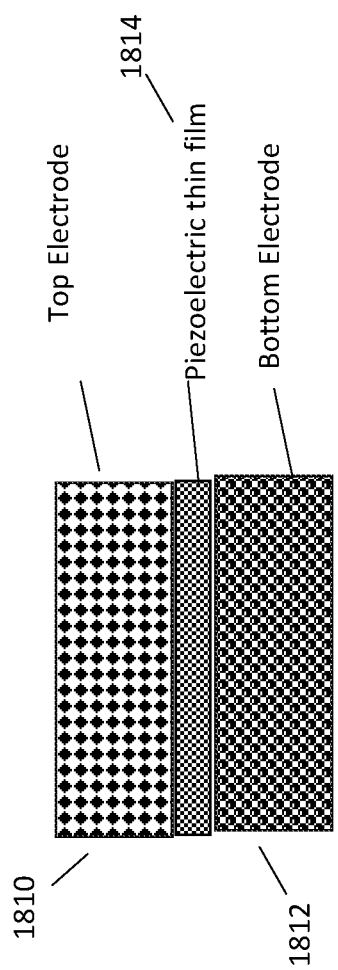
FIG. 18 is a diagram of an exemplary piezoelectric device and thin film formed by applying UHS systems and processes, in accordance with aspects of the present disclosure.

FIG. 18 is a diagram of an exemplary piezoelectric device and thin film formed by applying UHS systems and processes disclosed herein (e.g., FIGS. 1-5, 10-15, 21). UHS can be applied to co-sinter electrodes 1810, 1812 with a piezoelectric thin film 2014 to form a piezoelectric device, such as a piezoelectric actuator. The thin film 1814 can be printed or deposited onto one of the electrodes 1810, 1812. The printed thin film 1814 can be sintered using, for example, the system and processes of FIG. 5, among others disclosed herein. The other electrode can be deposited and sintered using the systems and processes disclosed herein, or can be deposited in another manner which persons skilled in the art will recognize.

Figure 19:
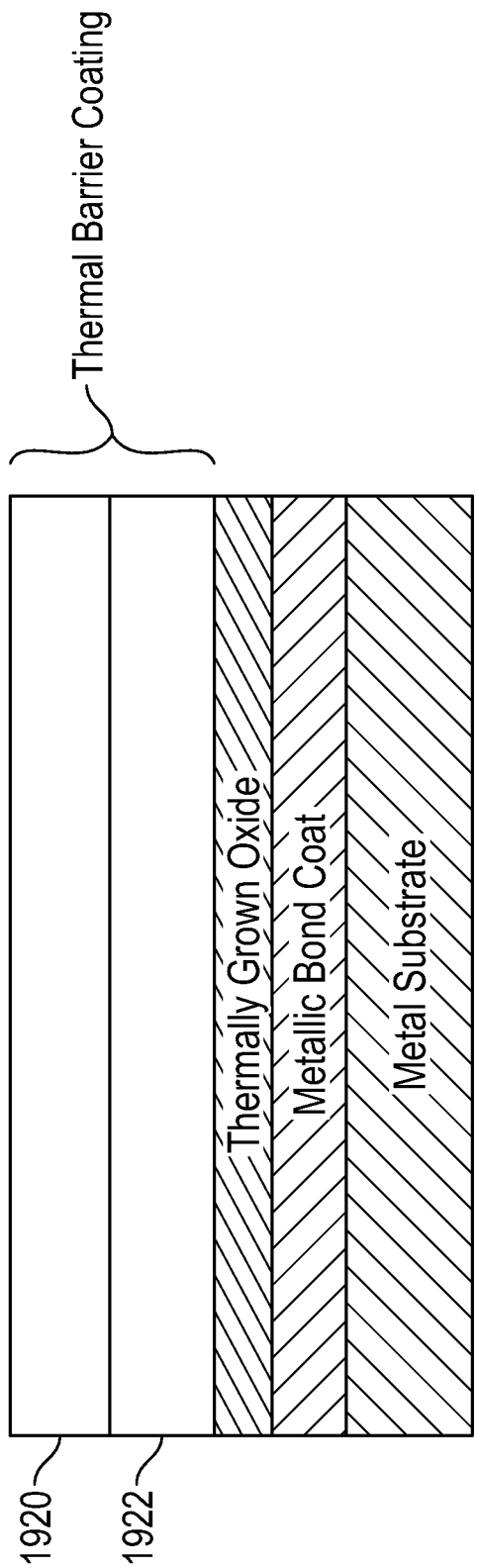
FIG. 19 is a diagram of an exemplary thermal barrier coating or environmental barrier coating formed by applying UHS systems and processes, in accordance with aspects of the present disclosure.

FIG. 19 is a diagram of an exemplary thermal barrier coating or environmental barrier coating formed by applying UHS systems and processes disclosed herein (e.g., FIGS. 1-5, 10-15, 21). For thermal barrier coating, the total thickness of the coating 1920, 1922 can be 1-500 µm. The thermal barrier coating can include a porous layer 1920 and a dense layer 1922. The porous layer 1920 pore sizes are approximately is 1-10,000 nm or smaller. The USH systems and processes disclosed herein can be used to sinter the thermal barrier coating onto metal substrate or onto a coated/treated metal substrate. The top porous layer 1920 and the bottom dense layer 1920 can be co-sintered in a single sintering process or can be sintered one layer at a time in separate sintering processes. In various embodiments, the layers of thermal barrier coating or environmental barrier coating can be deposited or printed and can then be sintered by the systems and processes of FIG. 5, among others disclosed herein.

Figure 20:
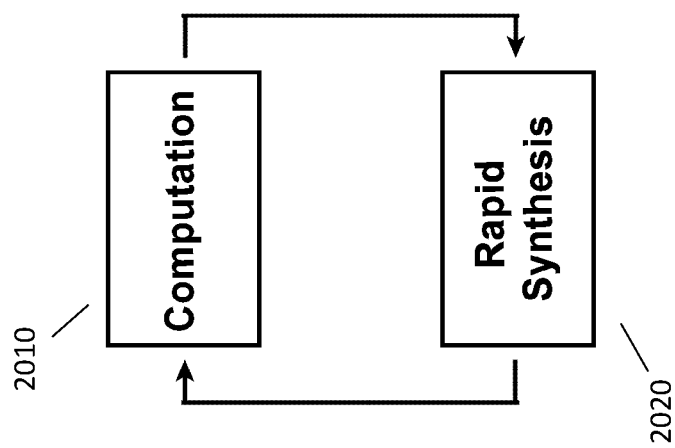
FIG. 20 is a diagram of an exemplary process of computation screening and fabrication of materials by applying UHS, in accordance with aspects of the present disclosure.

FIG. 20 is a diagram of a process of computation screening and fabrication of materials by applying UHS. Computation screening 2010 is a rapid material discovery technique and significantly facilitates the development of materials science. Materials exploration/mining is the concept of combining elements and compounds based on design principles, and recent artificial intelligence (AI) greatly accelerate materials discovery by a tremendous amount of computations and predictions. For theoretical predictions, actual material synthesis is needed to check computations for correct materials discovery. While computational study combined with artificial intelligence can lead to many predictions of new materials, a limiting factor for realizing the goal of verifying those predictions in synthesis speed.

The ability of the UHS process to rapidly and reliably synthesize 2020 a wide range of ceramics enables quick verification of new materials predicted by computation, thus greatly accelerating the screening rate for bulk ceramic materials.

As an example, lithium garnet compounds ($Li_7A_3B_2O_{12}$, A=La Group, B=Mo, W, Sn, Zr) can be used to demonstrate this rapid screening ability enabled by computational prediction and the UHS process. As shown in Supplement, FIG. 3B, a large number of compounds with other non-Li cation combinations based on garnet structures were predicted, and their energies were evaluated by density functional theory (DFT) calculations. The phase stabilities of these computer-generated hypothetical Li7-garnet compounds (Supplement, FIG. 3C) are described by the lower value of energy above hull ($E_{hull}$), which is determined from the energy difference of the compound in comparison to the stable phase equilibria on the phase diagram. A material with a small $E_{hull}$ (color-coded green) should feature good phase stability, and a high $E_{hull}$ (color-coded red) suggests an unstable phase. Compositional screening captured most known stoichiometric Li7-garnets, such as $Li_7La_3Zr_2O_{12}$, $Li_7Nd_3Zr_2O_{12}$, and $Li_7La_3Sn_2O_{12}$, which validates this computational method.

As an example of the rapid synthesis and materials screening capability, the computationally predicted Zr- and Sn-based garnet compositions featuring small $E_{hull}$ values listed in Supplement, FIG. 3C can be selected for experimental verification using the UHS process, which include $Li_7Pr_3Zr_2O_{12}$ (LPrZO), $Li_7Sm_3Zr_2O_{12}$ (LSmZO), $Li_7Nd_3Zr_2O_{12}$ (LNdZO), $Li_7Nd_3Sn_2O_{12}$ (LNdSnO), and $Li_7Sm_3Sn_2O_{12}$ (LSmSnO), as well as the corresponding 0.5 Ta-doped compositions in the B-site (e.g., $Li_{6.5}Sm_3Zr_{1.5}Ta_{0.5}O_{12}$ (LSmZTO)). The SEM images shown in Supplement, FIG. S13-17 indicate that the new garnet compounds are well synthesized and sintered, demonstrating uniform grain size and microstructure. The final relative densities are in the range of 91-96% a typical grain size in the range of 2-10 µm, achieved in as little as 10 seconds of UHS sintering. Additionally, XRD patterns shown in Supplement, FIG. S18 confirm that garnet phases (cubic phase for B-site doped, tetragonal phase for non-doped) were successfully synthesized for the predicted stable compositions. The newly discovered garnet compounds exhibit different optical properties and are not the typical white color, due to the different La-group elements (Supplement, FIG. 3D). These new garnets also have ionic conductivities of ~10'S/cm (LNdZTO shown as a representative sample in Supplement, FIG. S19), comparable to that of LLZO garnets. The UHS process was also used to synthesize unstable garnet compounds predicted by computation, such as $Li_7Gd_3Zr_2O_{12}$ and $Li_7Yb_3Zr_2O_{12}$. As expected, even though the SEM images show well sintered grains for $Li_7Yb_3Zr_2O_{12}$ and $Li_7Gd_3Zr_2O_{12}$ (Supplement, FIG. 520A, B), these two compositions do not form the garnet phase according to their XRD patterns (Supplement, FIG. 520C), which verifies the computational predictions.

An advantage of UHS is highly controllable temperature profile (i.e., heating/cooling rate and sintering temperature), which provides excellent tunability for synthesizing ceramics that are challenging to achieve using conventional procedures. For example, DFT computation predicts that Mo-based Li7-garnets have low $E_{hull}$ values (Supplement, FIG. 3C), which are novel garnet compositions that have never been previously synthesized. When synthesizing these Mo-based garnets, it was seen that the $MoO_2$ precursor tended to melt and evaporate at a relatively low temperature (~1100° C.), preventing the precursors from reacting and sintering at a high temperature (Supplement, FIG. S21A). This behavior is confirmed with SEM imaging and energy dispersive X-ray spectroscopy (EDS) mapping of the low-temperature sintered $Li_7La_3Mo_2O_{12}$ (LLMO) garnet in Supplement, FIGS. S21B and C, which show the $La_2O_3$ precursor particles surrounded by the melted $MoO_2$ phase, indicating little reaction. Enabled by the excellent tunability of the UHS process, the heating rate was tuned and the sintering temperature was increased up to about ~1500° C. to run the reaction faster while decreasing the sintering time to about three seconds to simultaneously minimize the evaporation of the $MoO_2$ (Supplement, FIG. S21D). The SEM image and EDS mapping in Supplement, FIGS. S21E and F indicate that the precursors react and form new grain morphologies. Furthermore, XRD pattern in Supplement, FIG. S22 confirms that the LLMO garnet phase was successfully achieved, though some unreacted $La_2O_3$ and secondary phase can still be identified. The sintered LLMO garnet pellet exhibits mixed ionic-electronic conductivities due to the multiple charge states of Mo and possible defects from the reducing atmosphere of UHS. The ionic and electronic conductivities were measured to be about $1.4 \times 10^{-5}$ S/cm and about $3.3 \times 10^{-6}$ S/cm (Supplement, FIG. S23), respectively. The mixed conductivities in LLMO are of interest as a potential electrode material for solid-state batteries. These findings demonstrate that UHS is highly adaptable and can be easily tailored for the synthesis of various materials with different properties for computation screening and material discovery.

Figure 21:
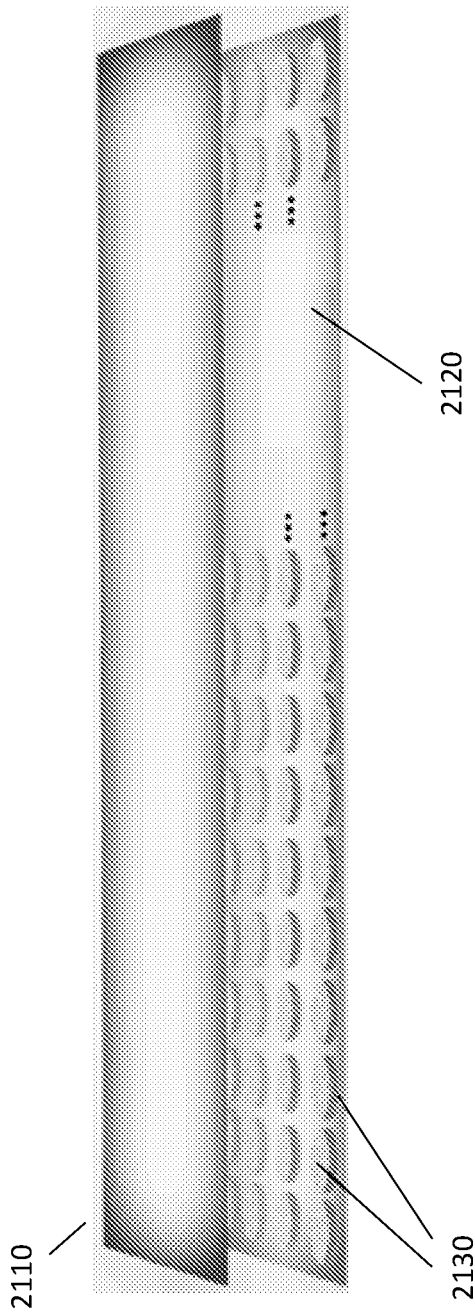
FIG. 21 is a diagram of an exemplary UHS system for simultaneously co-sintering multiple materials, in accordance with aspects of the present disclosure.

FIG. 21 is a diagram of an exemplary UHS system for simultaneously co-sintering multiple materials. The illustrated system enables rapid synthesis and screening of ceramics, glass, or other solid state materials. As an example, with the UHS heating elements 2110, 2120, over 100 ceramic pellets 2130 can be rapidly co-sintered in just about ten seconds using a 20×5 configuration, with an area of just ~12 cm×3 cm (for a pellet size of 5 mm), which is highly practical for materials screening processes. As an example of this scalability, ten garnet compositions were synthesized by co-sintering directly from the corresponding material precursors in one step (Supplement, FIG. 3F). In comparison, SPS is currently considered a high-throughput method to fabricate bulk ceramic specimens, as it can produce one specimen in a turnaround time of ~1-2 hours, which is at least 10-times slower than the UHS process if only one sample is being made. Moreover, SPS cannot easily be carried out in parallel experiments as it would require multiple expensive SPS instruments, which makes UHS more than $10^3$ times more efficient if fabricating 100 pellets simultaneously.

In various embodiments, the sizes of the materials can be adjusted from millimeters to meters to suit the application, and the size of the UHS system 2110, 2120 can be adjusted accordingly. The sample materials can be in direct contact with the heating elements 2110, 2120 or can be spaced apart from the heating elements 2110, 2120. For each UHS sintering operation, the composition of the sample materials 2130 can be the same or can be different. The composition of the materials 2130 can include, without limitation, ceramics, glass, metal, alloy, carbon, and/or other solid materials.

Accordingly, described above is are systems and methods that can enable high-throughput fabrication of bulk ceramics for discovering new materials, the sintering of thermally fragile compounds containing volatile components, and the fabrication of 3D printed complex structures and devices that cannot be made by SPS or flash sintering. Moreover, the UHS process can be universally applied to different materials, independent of their electrical characteristics. The rapid sintering enables the potential for scalable roll-to-roll sintering of ceramics by a conveyor strip (FIG. 4), as the precursor film can quickly pass through the heating elements to achieve continuous fabrication. The thin, high-temperature carbon heater in the UHS technique is also highly flexible and can conformally wrap around structures for rapid sintering of unconventional shapes and devices (Supplement, FIG. S30).

The UHS systems and process can be extended to a broad range of non-oxide high-temperature materials, including metals, carbides, borides, nitrides, and silicides, due to its high temperature (up to about 3000° C.). Also, UHS systems and processes may be used to fabricate functionally-graded materials (beyond simple multilayers) with minimum undesirable interdiffusion. The ultrafast, far-from-equilibrium nature of the UHS process may produce materials with non-equilibrium concentrations of point defects, dislocations, and other defects or metastable phases leading to desirable properties. In particular, the ultrafast UHS method can potentially produce non-equilibrium grain boundaries, thereby minimizing the detrimental equilibrium segregation of impurities, dopants, and defects (including non-stoichiometric grain boundaries). These are otherwise difficult to avoid in conventional high-temperature fabrication processes. Thus, UHS systems and processes open up new possibilities to mitigate high grain boundary resistance in solid electrolytes, as well as tailor various grain boundary properties for a broad range of other materials beyond solid electrolytes. The UHS method allows a highly controllable and tunable temperature profile to enable excellent control of sintering and microstructural evolution.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. The embodiments described and illustrated herein are exemplary, and variations are contemplated to be within the scope of the present disclosure. Various embodiments disclosed herein can be combined in ways not expressly described herein, and such combinations are contemplated to be within the scope of the present disclosure. Other elements, steps, methods, and techniques that are insubstantially different from those described above and/or in the appended claims are also intended to be within the scope of the disclosure.

What is claimed is:

1. A method comprising:
   providing a precursor material with respect to one or more conductive elements; and
   sintering the precursor material to form a sintered material via radiative and/or conductive heating at a first temperature, the first temperature being generated by applying one or more electric currents to the one or more conductive elements, each of the one or more electric currents passing through a respective one of the one or more conductive elements so as to cause Joule heating thereof, the first temperature being in a range of 500° C. to 3000° C., inclusive,
   wherein the sintered material is denser than the precursor material,
   during the sintering, the precursor material is spaced from at least one of the one or more conductive elements by no more than 1 cm,
   during the sintering, the one or more electric currents do not pass through the precursor material, and
   the sintering is for a first time in a range of 1 second to 1 hour, inclusive.

2. The method of claim 1, wherein:
   the one or more conductive elements comprises a first conductive element and a second conductive element, and
   during the sintering, the precursor material is in direct contact with the first conductive element and spaced from the second conductive element.

3. The method of claim 1, wherein the one or more conductive elements comprises a first conductive element and a second conductive element, and the precursor material is disposed between the first and second conductive elements during at least part of the sintering.

4. The method of claim 3, further comprising:
   holding the precursor material on a conveyor strip,
   wherein the first conductive element is positioned above a portion of the conveyor strip,
   the second conductive element is positioned below a portion of the conveyor strip or is a portion of the conveyor strip, and
   the providing the precursor material includes advancing the conveyor strip to convey the precursor material between the first conductive element and the second conductive element.

5. The method of claim 4, further comprising:
   at an end of the first time, advancing the conveyor strip to remove the sintered material from between the first conductive element and the second conductive element while maintaining the temperature of the first conductive element and the second conductive element.

6. The method of claim 1, wherein:
   (i) prior to the sintering, the applied one or more electric currents causes the one or more conductive elements to heat to the first temperature at a heating rate in a range of 100° C./min to 20,000° C./min;
   (ii) after the sintering, removal of the applied one or more electric currents causes the one or more conductive elements to cool from the first temperature at a cooling rate in a range of 100° C./min to 10,000° C./min; or
   (iii) both (i) and (ii).

7. The method of claim 1, further comprising:
   (a) moving the precursor material with respect to at least one of the one or more conductive elements;
   (b) moving at least one of the one or more conductive elements with respect to the precursor material; or
   (c) both (a) and (b).

8. The method of claim 7, wherein the moving of (a), the moving of (b), or both are during the sintering and define the first time.

9. The method of claim 7, wherein:
   the one or more conductive elements is a single conductive element having a size smaller than that of the precursor material; and
   the moving of (b) is via a mechanical arm such that heat from the single conductive element is directed at a different portion of the precursor material.

10. A method comprising:
    providing a precursor material with respect to one or more conductive elements; and
    sintering the precursor material to form a sintered material via radiative and/or conductive heating at a first temperature, the first temperature being generated by applying one or more electric currents to the one or more conductive elements, each of the one or more electric currents passing through a respective one of the one or more conductive elements so as to cause Joule heating thereof, the first temperature being in a range of 500° C. to 3000° C., inclusive,
    wherein the one or more conductive elements is a single conductive element,
    the sintered material is denser than the precursor material,
    the sintering is for a first time in a range of 1 second to 1 hour, inclusive, and
    during the sintering, the one or more electric currents do not pass through the precursor material.

11. The method of claim 3, wherein:
    the one or more electric currents are a first electric current passing along a first direction through the first conductive element and a second electric current passing along a second direction through the second conductive element; and
    the first and second conductive elements are spaced apart from each other along a third direction perpendicular to the first direction, the second direction, or both the first and second directions.

12. The method of claim 3, wherein, during the sintering, a temperature of the first conductive element is different than that of the second conductive element.

13. The method of claim 1, wherein the first time is in a range of one second to ten seconds.

14. A method comprising:
    providing a precursor material with respect to one or more conductive elements; and
    sintering the precursor material to form a sintered material via radiative and/or conductive heating at a first temperature, the first temperature being generated by applying one or more electric currents to the one or more conductive elements, each of the one or more electric currents passing through a respective one of the one or more conductive elements so as to cause Joule heating thereof, the first temperature being in a range of 500° C. to 3000° C., inclusive,
    wherein at least one of the one or more conductive elements is formed of conductive carbon,
    during the sintering, the one or more electric currents do not pass through the precursor material,
    the sintered material is denser than the precursor material, and
    the sintering is for a first time in a range of 1 second to 1 hour, inclusive.

15. The method of claim 1, wherein:
    the precursor material comprises a substrate having a film thereon; and the method further comprises, prior to the providing, depositing the film onto the substrate by sputtering, chemical vapor deposition, atomic layer deposition, or physical vapor deposition.

16. The method of claim 1, wherein:

the precursor material is a pellet, and the sintered material is less porous than the pellet;

the precursor material comprises a powder, and the sintered material comprises a ceramic, a glass, a metal, or alloy; or the precursor material comprises a plurality of compositions, and the sintering causes the plurality of compositions to react so as to form the sintered material.

17. The method of claim 10, wherein the first time is in a range of one second to ten seconds.

18. The method of claim 14, wherein, during the sintering, the precursor material is spaced from at least one of the one or more conductive elements by no more than 1 cm.

19. The method of claim 14, wherein the first temperature is at least 1000° C.

* * * * *